US011060636B2

(12) United States Patent
Dalmas, II et al.

(10) Patent No.: US 11,060,636 B2
(45) Date of Patent: Jul. 13, 2021

(54) ENGINES AND PUMPS WITH MOTIONLESS ONE-WAY VALVE

(71) Applicant: Quest Engines, LLC, Coopersburg, PA (US)

(72) Inventors: Elario Dino Dalmas, II, Macungie, PA (US); Brett J. Leathers, Allentown, PA (US)

(73) Assignee: QUEST ENGINES, LLC

(*) Notice: Subject to any disclaimer, the term of this patent is extended or adjusted under 35 U.S.C. 154(b) by 93 days.

(21) Appl. No.: 16/144,477

(22) Filed: Sep. 27, 2018

(65) Prior Publication Data
US 2019/0101089 A1 Apr. 4, 2019

Related U.S. Application Data

(60) Provisional application No. 62/565,842, filed on Sep. 29, 2017.

(51) Int. Cl.
*F16K 99/00* (2006.01)
*F02M 63/00* (2006.01)
(Continued)

(52) U.S. Cl.
CPC ............ *F16K 99/0021* (2013.01); *F02F 1/22* (2013.01); *F02M 35/10118* (2013.01);
(Continued)

(58) Field of Classification Search
CPC .......... F04B 53/1077; F15C 1/00; F15D 1/02; F16K 99/0021; Y10T 137/2147; Y10T 137/2273; Y10T 137/7784
(Continued)

(56) References Cited

U.S. PATENT DOCUMENTS 1,016,561 A 2/1912 Grabler
1,046,359 A 12/1912 Winton
(Continued)

FOREIGN PATENT DOCUMENTS

CN 201526371 7/2010
CN 106321916 1/2017
(Continued)

OTHER PUBLICATIONS

Graunke, K. et al., "Dynamic Behavior of Labyrinth Seals in Oilfree Labyrinth-Piston Compressors" (1984). International Compressor Engineering Conference. Paper 425. http://docs.lib.purdue.edu/icec/425.
(Continued)

*Primary Examiner* — Hung Q Nguyen
*Assistant Examiner* — Mark L. Greene
(74) *Attorney, Agent, or Firm* — Yohannan Law; David R. Yohannan

(57) ABSTRACT

Embodiments of apparatus for controlling the movement of matter, including but not limited to one-way fluid valves, are disclosed. The apparatus may include a transition nozzle, a funnel nozzle, and a reverse flow blocker arranged in series in a case. A counter-flow area may be disposed about the funnel nozzle. The apparatus may permit matter to flow in a first direction, and discourage or prevent flow in a direction reverse to the first direction. Control over the flow of matter also may enable matter to be harvested, sorted, separated or combined with injected matter.

18 Claims, 15 Drawing Sheets

(51) Int. Cl.
*F16K 15/00* (2006.01)
*F02F 1/22* (2006.01)
*F02M 35/10* (2006.01)
*F15D 1/02* (2006.01)

(52) U.S. Cl.
CPC .. *F02M 35/10275* (2013.01); *F02M 63/0031* (2013.01); *F02M 63/0078* (2013.01); *F16K 15/00* (2013.01); *F02M 63/0005* (2013.01); *F15D 1/02* (2013.01)

(58) Field of Classification Search
USPC ..................................... 137/819; 138/44, 45
See application file for complete search history.

(56) References Cited

U.S. PATENT DOCUMENTS

| | | |
|---|---|---|
| 1,329,559 A | 2/1920 | Tesla |
| 1,418,838 A | 6/1922 | Setz |
| 1,511,338 A | 10/1924 | Cyril |
| 1,527,166 A | 2/1925 | Maurice |
| 1,639,308 A | 8/1927 | Orr |
| 1,869,178 A | 7/1932 | Thuras |
| 1,967,682 A | 7/1934 | Ochtman, Jr. |
| 1,969,704 A | 8/1934 | D'Alton |
| 2,025,297 A | 12/1935 | Meyers |
| 2,224,475 A | 12/1940 | Evans |
| 2,252,914 A | 8/1941 | Balton |
| 2,283,567 A | 5/1942 | Barton |
| 2,442,917 A | 6/1948 | Butterfield |
| 2,451,271 A | 10/1948 | Balster |
| 2,468,976 A | 5/1949 | Herreshoff |
| 2,471,509 A | 5/1949 | Anderson |
| 2,878,990 A | 3/1950 | Zurcher |
| 2,644,433 A | 7/1953 | Anderson |
| 2,761,516 A | 9/1956 | Vassilkovsky |
| 2,766,839 A | 10/1956 | Baruch |
| 2,898,894 A | 8/1959 | Holt |
| 2,915,050 A | 12/1959 | Allred |
| 2,956,738 A | 10/1960 | Rosenschold |
| 2,977,943 A | 4/1961 | Lieberherr |
| 2,979,046 A | 4/1961 | Hermann |
| 3,033,184 A | 5/1962 | Jackson |
| 3,035,879 A | 5/1962 | Jost |
| 3,113,561 A | 12/1963 | Heintz |
| 3,143,282 A | 8/1964 | McCrory |
| 3,154,059 A | 10/1964 | Witzky |
| 3,171,425 A | 3/1965 | Berlyn |
| 3,275,057 A | 9/1966 | Trevor |
| 3,399,008 A | 8/1968 | Farrell |
| 3,409,410 A | 11/1968 | Spence |
| 3,491,654 A | 1/1970 | Zurcher |
| 3,534,771 A | 10/1970 | Everdam |
| 3,621,821 A | 11/1971 | Jarnuszkiewicz |
| 3,749,318 A | 7/1973 | Cottell |
| 3,881,459 A | 5/1975 | Gaetcke |
| 3,892,070 A | 7/1975 | Bose |
| 3,911,753 A | 10/1975 | Daub |
| 3,973,532 A | 8/1976 | Litz |
| 4,043,224 A | 8/1977 | Quick |
| 4,046,028 A | 9/1977 | Vachris |
| 4,077,429 A | 3/1978 | Kimball |
| 4,127,332 A | 11/1978 | Thiruvengadam |
| 4,128,388 A | 12/1978 | Freze |
| 4,164,988 A | 8/1979 | Virva |
| 4,182,282 A | 1/1980 | Pollet |
| 4,185,597 A | 1/1980 | Cinquegrani |
| 4,271,803 A | 6/1981 | Nakanishi |
| 4,300,499 A | 11/1981 | Nakanishi |
| 4,312,305 A | 1/1982 | Noguchi |
| 4,324,214 A | 4/1982 | Garcea |
| 4,331,118 A | 5/1982 | Cullinan |
| 4,332,229 A | 6/1982 | Schuit |
| 4,343,605 A | 8/1982 | Browning |
| 4,357,916 A | 11/1982 | Noguchi |
| 4,383,508 A | 5/1983 | Irimajiri |
| 4,467,752 A | 8/1984 | Yunick |
| 4,480,597 A | 11/1984 | Noguchi |
| 4,488,866 A | 12/1984 | Schirmer |
| 4,541,377 A | 9/1985 | Amos |
| 4,554,893 A | 11/1985 | Vecellio |
| 4,570,589 A | 2/1986 | Fletcher |
| 4,576,126 A | 3/1986 | Ancheta |
| 4,592,318 A | 6/1986 | Pouring |
| 4,597,342 A | 7/1986 | Green |
| 4,598,687 A | 7/1986 | Hayashi |
| 4,669,431 A | 6/1987 | Simay |
| 4,715,791 A | 12/1987 | Berlin |
| 4,724,800 A | 2/1988 | Wood |
| 4,756,674 A | 7/1988 | Miller |
| 4,788,942 A | 12/1988 | Pouring |
| 4,836,154 A | 6/1989 | Bergeron |
| 4,874,310 A | 10/1989 | Seemann |
| 4,879,974 A | 11/1989 | Alvers |
| 4,919,611 A | 4/1990 | Flament |
| 4,920,937 A | 5/1990 | Sasaki |
| 4,936,269 A | 6/1990 | Beaty |
| 4,969,425 A | 11/1990 | Slee |
| 4,990,074 A | 2/1991 | Nakagawa |
| 4,995,349 A | 2/1991 | Tuckey |
| 5,004,066 A | 4/1991 | Furukawa |
| 5,007,392 A | 4/1991 | Niizato |
| 5,020,504 A | 6/1991 | Morikawa |
| 5,083,539 A | 1/1992 | Cornelio |
| 5,154,141 A | 10/1992 | McWhorter |
| 5,168,843 A | 12/1992 | Franks |
| 5,213,074 A | 5/1993 | Imagawa |
| 5,222,879 A | 6/1993 | Kapadia |
| 5,251,817 A | 10/1993 | Ursic |
| 5,343,618 A | 9/1994 | Arnold |
| 5,357,919 A | 10/1994 | Ma |
| 5,390,634 A | 2/1995 | Walters |
| 5,397,180 A | 3/1995 | Miller |
| 5,398,645 A | 3/1995 | Haman |
| 5,454,712 A | 10/1995 | Yap |
| 5,464,331 A | 11/1995 | Sawyer |
| 5,479,894 A | 1/1996 | Noltemeyer |
| 5,694,891 A | 12/1997 | Liebich |
| 5,714,721 A | 2/1998 | Gawronski |
| 5,728,078 A * | 3/1998 | Powers, Jr. ........... A61M 1/008 604/246 |
| 5,779,461 A | 7/1998 | Iizuka |
| 5,791,303 A | 8/1998 | Skripov |
| 5,872,339 A | 2/1999 | Hanson |
| 5,937,821 A | 8/1999 | Oda |
| 5,957,096 A | 9/1999 | Clarke |
| 6,003,488 A | 12/1999 | Roth |
| 6,019,188 A | 2/2000 | Nevill |
| 6,119,648 A | 9/2000 | Araki |
| 6,138,616 A | 10/2000 | Svensson |
| 6,138,639 A | 10/2000 | Hiraya |
| 6,199,369 B1 | 3/2001 | Meyer |
| 6,205,962 B1 | 3/2001 | Berry, Jr. |
| 6,227,809 B1 * | 5/2001 | Forster ................. F04B 43/046 417/413.2 |
| 6,237,164 B1 | 5/2001 | LaFontaine |
| 6,257,180 B1 | 7/2001 | Klein |
| 6,363,903 B1 | 4/2002 | Hayashi |
| 6,382,145 B2 | 5/2002 | Matsuda |
| 6,418,905 B1 | 7/2002 | Baudlot |
| 6,446,592 B1 | 9/2002 | Wilksch |
| 6,474,288 B1 | 11/2002 | Blom |
| 6,494,178 B1 | 12/2002 | Cleary |
| 6,508,210 B2 | 1/2003 | Knowlton |
| 6,508,226 B2 | 1/2003 | Tanaka |
| 6,536,420 B1 | 3/2003 | Cheng |
| 6,639,134 B2 | 10/2003 | Schmidt |
| 6,668,703 B2 | 12/2003 | Gamble |
| 6,682,313 B1 | 1/2004 | Sulmone |
| 6,691,932 B1 | 2/2004 | Schultz |
| 6,699,031 B2 | 3/2004 | Kobayashi |
| 6,705,281 B2 | 3/2004 | Okamura |
| 6,718,938 B2 | 4/2004 | Szorenyi |
| 6,758,170 B1 | 7/2004 | Walden |

(56) References Cited

U.S. PATENT DOCUMENTS

| | | |
|---|---|---|
| 6,769,390 B2 | 8/2004 | Hattori |
| 6,814,046 B1 | 11/2004 | Hiraya |
| 6,832,589 B2 | 12/2004 | Kremer |
| 6,834,626 B1 | 12/2004 | Holmes |
| 6,971,379 B2 | 12/2005 | Sakai |
| 6,973,908 B2 | 12/2005 | Paro |
| 7,074,992 B2 | 7/2006 | Schmidt |
| 7,150,609 B2 | 12/2006 | Kiem |
| 7,261,079 B2 | 8/2007 | Gunji |
| 7,296,545 B2 | 11/2007 | Ellingsen, Jr. |
| 7,341,040 B1 | 3/2008 | Wiesen |
| 7,360,531 B2 | 4/2008 | Yohso |
| 7,452,191 B2 | 11/2008 | Tell |
| 7,559,298 B2 | 7/2009 | Cleeves |
| 7,576,353 B2 | 8/2009 | Diduck |
| 7,584,820 B2 | 9/2009 | Parker |
| 7,628,606 B1 | 12/2009 | Browning |
| 7,634,980 B2 | 12/2009 | Jarnland |
| 7,717,701 B2 | 5/2010 | D'Agostini |
| 7,810,479 B2 | 10/2010 | Naquin |
| 7,900,454 B2 | 3/2011 | Schoell |
| 7,984,684 B2 | 7/2011 | Hinderks |
| 8,037,862 B1 | 10/2011 | Jacobs |
| 8,215,292 B2 | 7/2012 | Bryant |
| 8,251,040 B2 | 8/2012 | Jang |
| 8,284,977 B2 | 10/2012 | Ong |
| 8,347,843 B1 | 1/2013 | Batiz-Vergara |
| 8,385,568 B2 | 2/2013 | Goel |
| 8,479,871 B2 | 7/2013 | Stewart |
| 8,640,669 B2 | 2/2014 | Nakazawa |
| 8,656,870 B2 | 2/2014 | Sumilla |
| 8,714,135 B2 | 5/2014 | Anderson |
| 8,776,759 B2 | 7/2014 | Cruz |
| 8,800,527 B2 | 8/2014 | McAlister |
| 8,827,176 B2 | 9/2014 | Browning |
| 8,857,405 B2 | 10/2014 | Attard |
| 8,863,724 B2 | 10/2014 | Shkolnik |
| 8,919,321 B2 | 12/2014 | Burgess |
| 9,175,736 B2 | 11/2015 | Greuel |
| 9,289,874 B1 | 3/2016 | Sabo |
| 9,309,807 B2 | 4/2016 | Burton |
| 9,441,573 B1 | 9/2016 | Sergin |
| 9,512,779 B2 | 12/2016 | Redon |
| 9,736,585 B2 | 8/2017 | Pattok |
| 9,739,382 B2 | 8/2017 | Laird |
| 9,822,968 B2 | 11/2017 | Tamura |
| 9,854,353 B2 | 12/2017 | Wang |
| 9,938,927 B2 | 4/2018 | Ando |
| 2002/0114484 A1 | 8/2002 | Crisco |
| 2002/0140101 A1 | 10/2002 | Yang |
| 2003/0111122 A1 | 6/2003 | Horton |
| 2005/0036896 A1 | 2/2005 | Navarro |
| 2005/0087166 A1 | 4/2005 | Rein |
| 2005/0155645 A1 | 7/2005 | Freudendahl |
| 2005/0257837 A1 | 11/2005 | Bailey |
| 2006/0230764 A1 | 10/2006 | Schmotolocha |
| 2007/0039584 A1 | 2/2007 | Ellingsen, Jr. |
| 2007/0101967 A1 | 5/2007 | Pegg |
| 2008/0169150 A1 | 7/2008 | Kuo |
| 2008/0184878 A1 | 8/2008 | Chen |
| 2008/0185062 A1 | 8/2008 | Johannes Nijland |
| 2010/0071640 A1 | 3/2010 | Mustafa |
| 2011/0030646 A1 | 2/2011 | Barry |
| 2011/0132309 A1 | 6/2011 | Turner |
| 2011/0139114 A1 | 6/2011 | Nakazawa |
| 2011/0235845 A1 | 9/2011 | Wang |
| 2012/0103302 A1 | 5/2012 | Attard |
| 2012/0114148 A1 | 5/2012 | Goh Kong San |
| 2012/0186561 A1 | 7/2012 | Bethel |
| 2013/0036999 A1 | 2/2013 | Levy |
| 2013/0327039 A1 | 12/2013 | Schenker et al. |
| 2014/0056747 A1 | 2/2014 | Kim |
| 2014/0109864 A1 | 4/2014 | Drachko |
| 2014/0199837 A1 | 7/2014 | Hung |
| 2014/0361375 A1 | 12/2014 | Deniz |
| 2015/0059718 A1 | 3/2015 | Claywell |
| 2015/0153040 A1 | 6/2015 | Rivera Garza |
| 2015/0167536 A1 | 6/2015 | Toda et al. |
| 2015/0184612 A1 | 7/2015 | Takada et al. |
| 2015/0337878 A1 | 11/2015 | Schlosser |
| 2015/0354570 A1 | 12/2015 | Karoliussen |
| 2016/0017839 A1 | 1/2016 | Johnson |
| 2016/0064518 A1 | 3/2016 | Liu |
| 2016/0258347 A1 | 9/2016 | Riley |
| 2016/0265416 A1 | 9/2016 | Ge |
| 2016/0348611 A1 | 12/2016 | Suda et al. |
| 2016/0348659 A1 | 12/2016 | Pinkerton |
| 2016/0356216 A1 | 12/2016 | Klyza |
| 2017/0248099 A1 | 8/2017 | Wagner |
| 2017/0260725 A1 | 9/2017 | McAlpine |
| 2018/0096934 A1 | 4/2018 | Siew |
| 2018/0130704 A1 | 5/2018 | Li |
| 2019/0039066 A1* | 2/2019 | Gilbert .............. B01L 3/502707 |
| 2019/0101230 A1* | 4/2019 | Dalmas, II .......... F16K 99/0021 |

FOREIGN PATENT DOCUMENTS

| | | |
|---|---|---|
| CN | 206131961 | 4/2017 |
| DE | 19724225 | 12/1998 |
| EP | 0025831 | 4/1981 |
| EP | 2574796 | 4/2013 |
| FR | 1408306 | 8/1965 |
| FR | 2714473 | 6/1995 |
| GB | 104331 | 1/1918 |
| GB | 139271 | 3/1920 |
| GB | 475179 | 11/1937 |
| GB | 854135 | 11/1960 |
| GB | 1437340 | 5/1976 |
| GB | 1504279 | 3/1978 |
| GB | 1511538 | 5/1978 |
| GB | 2140870 | 12/1984 |
| JP | S5377346 | 7/1978 |
| JP | S5833393 | 2/1983 |
| JP | 58170840 | 10/1983 |
| JP | S5973618 | 4/1984 |
| JP | H02211357 | 8/1990 |
| JP | H0638288 | 5/1994 |
| JP | 2000064905 | 3/2000 |
| JP | 2003065013 | 3/2003 |
| JP | 5535695 | 7/2014 |
| TW | 201221753 | 6/2012 |
| WO | 1983001485 | 4/1983 |
| WO | 2006046027 | 5/2006 |
| WO | 2007065976 | 6/2007 |
| WO | 2010118518 | 10/2010 |
| WO | 2016145247 | 9/2016 |

OTHER PUBLICATIONS

International Searching Authority Search Report and Written Opinion for application PCT/US2018/024102, dated Jun. 25, 2018, 10 pages.

International Searching Authority Search Report and Written Opinion for application PCT/US2018/024477, dated Jul. 20, 2018, 14 pages.

International Searching Authority Search Report and Written Opinion for application PCT/US2018/024485, dated Jun. 25, 2018, 16 pages.

International Searching Authority Search Report and Written Opinion for application PCT/US2018/024844, dated Jun. 8, 2018, 9 pages.

International Searching Authority Search Report and Written Opinion for application PCT/US2018/024852, dated Jun. 21, 2018, 9 pages.

International Searching Authority Search Report and Written Opinion for application PCT/US2018/025133, dated Jun. 28, 2018, 9 pages.

International Searching Authority Search Report and Written Opinion for application PCT/US2018/025151, dated Jun. 25, 2018, 14 pages.

(56) References Cited

OTHER PUBLICATIONS

International Searching Authority Search Report and Written Opinion for application PCT/US2018/025471, dated Jun. 21, 2018, 10 pages.
International Searching Authority Search Report and Written Opinion for application PCT/US2018/029947, dated Jul. 26, 2018, 12 pages.
International Searching Authority Search Report and Written Opinion for application PCT/US2018/030937, dated Jul. 9, 2018, 7 pages.
International Searching Authority Search Report and Written Opinion for application PCT/US2018/053264, dated Dec. 3, 2018, 10 pages.
International Searching Authority Search Report and Written Opinion for application PCT/US2018/053350, dated Dec. 4, 2018, 7 pages.
International Searching Authority Search Report and Written Opinion for application PCT/US2019/014936, dated Apr. 18, 2019, 9 pages.
International Searching Authority Search Report and Written Opinion for application PCT/US2019/015189, dated Mar. 25, 2019, 10 pages.
Keller, L. E., "Application of Trunk Piston Labyrinth Compressors in Refrigeration and Heat Pump Cycles" (1992). International Compressor Engineering Conference. Paper 859. http://docs.lib.purdue.edu/icec/859.
Quasiturbine Agence, "Theory—Quasiturbine Concept" [online], Mar. 5, 2005 (Mar. 5, 2005), retrieved from the internet on Jun. 29, 2018) URL:http://quasiturbine.promci.qc.ca/ETheoryQTConcept.htm; entire document.
Vetter, H., "The Sulzer Oil-Free Labyrinth Piston Compressor" (1972). International Compressor Engineering Conference. Paper 33. http://docs.lib.purdue.edu/icec/33.

* cited by examiner

ENGINES AND PUMPS WITH MOTIONLESS ONE-WAY VALVE

CROSS REFERENCE TO RELATED APPLICATIONS

This application relates to and claims the priority of U.S. provisional patent application Ser. No. 62/565,842, which was filed Sep. 29, 2017.

FIELD OF THE INVENTION

Embodiments of the present invention relate generally to engines and pumps incorporating motionless one-way valves for controlling the direction of movement of fluids through the engines and pumps.

BACKGROUND OF THE INVENTION

There are many apparatus and methods that require the use of valves or other structures to control the direction of movement of matter. For example, some internal combustion engines utilize cooperative engine cylinder and piston arrangements with appropriate control over the introduction and exhaust of fluids into and out of the cylinder to generate power using a pumping motion. Conversely, pumps and compressors (a type of pump) may use cylinder and piston arrangements with appropriate control over the introduction and exhaust of fluids into and out of the cylinder to generate compressed fluid or move fluid from one location to another. Control over the introduction and exhaust of fluids from engine and pump cylinders has been achieved using valves. Poppet valves, for example, have been used to control the flow of an air or a fuel/air mixture through an engine cylinder.

While poppet valves are effective, they include moving parts which are prone to fail over time, and which require energy to operate. Further, poppet valves, like many other valves, must be physically actuated (opened and closed) according to a specified timing regime to control the flow of fluid so that it flows predominantly in one direction. Accordingly, there is a need for valves that control the movement of matter without the need to power them, without the need for moving parts, and/or without the need to time their actuation. Further, there is a need for engines and pumps that operate with improved efficiency, performance, and/or longevity as a result of improved control over the movement of fluids within them.

Fluid valves or valve surrogates that reduce or eliminate the need for moving parts are known. For example, the Valvular Conduit invented by Nikola Tesla includes no moving parts. Tesla's Valvular Conduit may leak fluid in the reverse direction to that intended for fluid flow, however. Accordingly, there is a need for apparatus that provide relatively low leakage (i.e., reverse flow) of the controlled matter (e.g., fluid) for short time period events without increasing the need for moving parts in the apparatus.

There is also a need for apparatus that control the flow of fluids involving high differential pressures. Moving parts in high pressure valves can be particularly vulnerable to damage due to the friction forces between the parts caused by the pressure. Furthermore, the damage from abrasive particles to moving parts in a valve may be amplified by increased fluid pressures. Accordingly, there is a need to limit or eliminate moving parts from high pressure apparatus.

It is to be appreciated that the reference herein to an engine or a pump "cylinder" is not limited to a chamber having a cylindrically shaped cross-section. Instead, the term cylinder refers to any chamber or cavity that receives a piston having an outer shape adapted to allow the piston to seal against the sidewall of the cylinder but at the same time permit the piston to slide back and forth reciprocally within the cylinder in a pumping motion. Furthermore, it is appreciated that some engines and pumps, such as rotary engines and pumps for example, may utilize chambers of varying sizes and shapes in lieu of a cylinder, and may use rotors or other moving elements in lieu of pistons. The embodiments of the invention are not intended to be limited to use with engines and pumps having cylinders and pistons, but may be used in engines and pumps having other structures as well.

OBJECTS OF THE INVENTION

Accordingly, it is an object of some, but not necessarily all, embodiments of the present invention to improve the efficiency of apparatus that require control over the movement of matter by reducing or eliminating the need for moving parts for control of the movement of matter.

It is a further object of some, but not necessarily all, embodiments of the present invention to improve apparatus that require control over the movement of matter by reducing or eliminating the need to provide a source of power for such control.

It is a still further object of some, but not necessarily all, embodiments of the present invention to improve apparatus that require control over the movement of matter by increasing the lifespan of the structure providing control over the movement of matter.

It is a still further object of some, but not necessarily all, embodiments of the present invention to improve apparatus that require control over the movement of matter by reducing or eliminating the need to provide active control over the movement of matter. Instead, it is an object of some, but not necessarily all, embodiments of the present invention to provide passive control over the movement of matter.

It is a still further object of some, but not necessarily all, embodiments of the present invention to provide apparatus and methods for controlling the movement of matter in a fluid state and/or non-fluid state.

It is a still further object of some, but not necessarily all, embodiments of the present invention to reduce pumping losses as a result of valve or rectifier operation.

It is a still further object of some, but not necessarily all, embodiments of the present invention to improve relative flow rates for the movement of matter.

It is a still further object of some, but not necessarily all, embodiments of the present invention to improve tolerance for use with fluids having suspended and/or abrasive particles within the working medium, which may assist with self-cleaning of an apparatus made in accordance with an embodiment of the invention, and provide prolonged apparatus lifespan due to decreased vulnerability to wear.

It is a still further object of some, but not necessarily all, embodiments of the present invention to improve the efficiency of internal combustion engines and pumps by decreasing intake valve timing compromises required to meet mandated fuel efficiency standards, mandated emissions standards, manufacturing cost targets, engine control system complexity limits, and power/performance requirements.

It is a still further object of some, but not necessarily all, embodiments of the present invention to replace a poppet-type intake valve by regulating combustion air or mixture flow time, duration, mass and/or rate with reduced reliance on moving parts. Embodiments of the present invention may provide similar or better performance while requiring less maintenance, avoiding piston/valve interference issues, and eliminating mechanical valve inertia issues, all of which detract from performance. Embodiments of the invention may allow more innovative timing and less restricted head/piston geometry to further enhance the engine design.

It is a still further object of some, but not necessarily all, embodiments of the present invention to allow an engine to be designed to take advantage of the inertia of the incoming air/charge. This may permit a widened RPM band for a ram effect. This ram effect may induce inertial supercharging when the intake manifold and passages are tuned to induce resonant pressure waves which may push and compress the incoming air/charge into the internal combustion engine chamber(s).

It is a still further object of some, but not necessarily all, embodiments of the present invention to be compatible with water or water-blend injection and carbureted or throttle-body/port/direct fuel injection of fuels by virtue of being internally self-cleaning of liquid and particulate matter. Embodiments of the present invention may induce a Coanda effect which tends to cause the air stream containing particles to cling to the surfaces and to be pushed through the primary central forward flow path with the particles contained therein. Should any other particles deviate or be located outside of this path, the Venturi effect may draw them back into the path and expel them. During reverse flow conditions, the outer counter-flow passages of embodiments of the present invention may deposit the majority of the particles in the flow near the primary central forward flow path, from which point the particles may be expelled during a forward flow cycle.

It is a still further object of some, but not necessarily all, embodiments of the present invention to improve engine tuning and control. Embodiments of the present invention may provide more optimal flow path diameter, flow path geometry/shape, flow path length, surface finish/geometry, cavity size/geometry, sub-section quantity, and sub-section component geometry. Embodiments of the present invention may be tailored for high-flow rates and many other design requirements. These parameters may also be tuned in unison with the air intake parameters to optimize reflected resonant pressure waves, which create a stronger sealing action and/or inertial supercharging of the combustion chamber(s). The exhaust may also be tuned and flow optimized using traditional header and exhaust system design methods. The exhaust may also utilize divergent-convergent chambers to induce a Kadenacy effect and/or exhaust pulse pressure charging. This may be accomplished by tuning reflected resonant pressure waves to influence flow rate and pressures during exhaust gas evacuation/scavenging and therefore also affect combustion chamber loading. All of these tuning paths may allow engine characteristics to be tailored over a specific RPM band similar to traditional intake valve based systems.

It is a still further object of some, but not necessarily all, embodiments of the present invention to be compatible with engines using superchargers, turbochargers, pressure-wave superchargers, and pre-/inter-/after-coolers. Embodiments of the present invention may work in conjunction with the aforementioned devices to further increase the volumetric efficiency of the engine. Retrofitted and new model head designs may require slightly larger or different model volumetric efficiency enhancing devices than a previously designed traditional intake valve implementation due to the increased performance of embodiments of the present invention.

It is a still further object of some, but not necessarily all, embodiments of the present invention to replace reed valves in two-stroke cycle internal combustion engine applications. Embodiments of the present invention may provide improved crankcase filling performance across the engine's RPM range. At low RPMs, reed valves may not fully open resulting in a pumping loss. At high RPMs, reed valves tend to float and may never fully seat thereby decreasing power or preventing the proper functioning of the engine above a specific RPM. Embodiments of the present invention also may extend the engine's service interval as there are no reeds to crack or abrade.

It is a still further object of some, but not necessarily all, embodiments of the present invention to replace wall-based intake/transfer ports in a two-stroke cycle internal combustion engines. This may permit through chamber flow similar to traditional uniflow scavenging but in the reverse direction. Traditional uniflow designs use a wall intake port revealed near the piston bottom dead center position to provide intake air/charge flow toward an exhaust valve in the head. Embodiments of the present invention may provide intake air/charge flows from the top of the combustion chamber to a low and shallow exhaust port revealed by the piston around the bottom dead center position. This may provide improved chamber filling and emptying thereby reducing pumping losses and improving chamber scavenging with a simpler design. This also may permit more of the created pressure to be harnessed by having slightly more time before the exhaust opens thereby increasing engine efficiency. This method may be particularly effective when the intake air/charge pressure is boosted by a supercharger or turbocharger, which is common in many diesel two-stroke cycle engines.

It is a still further object of some, but not necessarily all, embodiments of the present invention to relocate the wall-based intake/transfer port from an end of the chamber to the center of the chamber in a two-stroke cycle internal combustion engine utilizing an opposing piston design. This may permit the placement of two shallow exhaust port areas, which are uncovered by the two pistons near the minimum stroke positions. This permits the centrally located wall intake/transfer port to flow to the exhaust port areas similar to the previously discussed reverse uniflow implementation. This also may provide improved chamber filling and may decrease the time necessary to flush and fill the chamber thereby reducing pumping losses and improving chamber scavenging into a higher RPM range. It also may allow more of the created pressure to be harnessed without the need for crankshaft phasing to vary the positions of the two pistons in a more complex motion thereby increasing engine efficiency and simplifying engine design to reduce cost. It is conceivable that the pistons may be able to be phased slightly differently from a true opposing phasing and configured with a slightly longer or uneven stroke length. This would allow a slightly extended time of near constant volume around the beginning of the ignition event to account for ignition delay and/or to increase the maximum chamber pressure, but possibly at the cost of a non-uniform and increased duration exhaust/scavenge event.

It is a still further object of some, but not necessarily all, embodiments of the present invention to replace wall-based intake/transfer ports and relocate the exhaust port below the piston skirt in a two-stroke cycle internal combustion engine utilizing a single piston per chamber or an opposing piston design. This concept locates the exhaust port(s) within the overlap area of the piston skirt(s) when the piston is at minimum stroke and provides a connecting passage within the piston(s) to link to the exhaust port(s). This embodiment may have the added benefit of providing a swirl and squish pre-ignition pan/chamber, which is readily compatible with direct injection to improve lean burn capabilities, to reduce emissions, to increase flame front propagation rate, to increase the ram/momentum effect of coherently moving gases, and to provide a scrubbing vortex movement of the gasses within the combustion chamber during the exhaust/scavenge cycle.

It is a still further object of some, but not necessarily all, embodiments of the present invention to replace the intake poppet valve(s) in a two-stroke cycle, four-stroke cycle, and/or multi-stroke cycle internal combustion engine. Embodiments of the present invention may provide improved chamber filling by allowing the momentum of the air/charge being loaded to continue until a sufficient back pressure is generated by the beginning of the compression stroke. This may reduce pumping losses, allow less counter-flow of exhaust gasses into the intake manifold, and improve chamber scavenging. This may also improve high-speed operation of the engine by allowing better chamber filling into significantly higher RPMs without the need for stiffer valve springs and radical camshaft geometry.

It is a still further object of some, but not necessarily all, embodiments of the present invention to replace the intake poppet valve(s) in a two-stroke cycle, four-stroke cycle, or multi-stroke cycle internal combustion engine and allow the scavenging to be directly controlled by the exhaust valve timing alone. Once the chamber pressure is at or below the intake air/charge pressure-bleed over from the intake to the open exhaust valve will automatically occur. Bleed over may continue due to the induced gas momentum even as the exhaust valve is being closed. This may allow a simplification of the control strategy, a reduction in system complexity, and a reduction in cost while adding improved service life and performance to the engine. This also may allow the engine control system to be tailored more easily for boosted applications as well.

It is a still further object of some, but not necessarily all, embodiments of the present invention to work in conjunction with traditional valve(s) in an internal combustion engine and allow the intake valves to function in a hybrid or steady state. This may permit the engine to operate at significantly higher RPMs by achieving higher flow rates at both low and high RPMs with minimal compression loss blending the best attributes of both traditional valves and motionless one-way valves. The motionless one-way valve may be used in series and/or parallel with traditional intake valves. In one series embodiment, the intake poppet valve would be opened and closed like a traditional engine application for the lower RPM range and would remain fully open for the higher RPM range. This allows the poppet valve to provide the sealing action for the lower RPM range, where a high-flow optimized motionless one-way valve may not provide enough sealing action or sealing duration for the longer time period compression and expansion events. This also allows a high-flow optimized motionless one-way valve to provide the sealing action for the higher RPM range where the poppet valve inertia and movement delay time interferes with the desired system functioning. The normal varied operating conditions of a consumer street vehicle should allow for sufficient contact intervals to cool the intake poppet valve. However, should the engine be designed for extended high RPM running, as in race or heavy equipment applications, the intake poppet valve may require cooling by: injection of fuel or water/water-blend towards the poppet valve, internal sodium cooling or a similar strategy in the stem, and/or employ materials/coatings/processes normally utilized on exhaust valves to guarantee the lifelong integrity of the valve. Another series embodiment would allow the poppet valve to function like a throttle plate, but function per cylinder as it is contained within the engine and therefore be slightly more responsive and flexible. This allows the opening/closing rate and opening distance to be tailored by a computer system per cylinder and per operating conditions. In such a control system it may be desirable to attain maximum aperture open to start and then decrease significantly after a delay during low RPM and/or low load conditions. In a similar embodiment, the intake poppet valve would provide supplementary air as engine conditions warrant similar to variable multi-valve head designs. This configuration can provide flow restrictions for specific engine operating conditions and it can provide timed, offset flow bursts Which can induce turbulence and/or swirl to enhance engine functions at appropriate times. Another similar embodiment allows the engine to function as a variable modified Atkinson cycle engine when required, by allowing a greater volume of controlled counter-flow into the intake manifold during the start of compression to change the compression ratio and/or the compression/expansion cycle volume ratio to increase engine efficiency as conditions warrant. While the majority of the preceding discussion involved poppet valves, it is easy to recognize that these hybrid valve embodiments would function equally well with other valve types.

It is a still further object of some, but not necessarily all, embodiments of the present invention to be compatible with intake ports in rotary internal combustion engines. Embodiments of the present invention may allow the ports to be enlarged and/or relocated to provide improved chamber filling by allowing a longer tilling time until compression is started. The larger aperture and longer filling times may decrease pumping losses and increase volumetric efficiency. This may also allow a larger RPM window for the power band produced by inertial supercharging as the port is open for a longer time.

It is a still further object of some, but not necessarily all, embodiments of the present invention to replace rotary and/or sliding sleeve valves in internal combustion engines. Replacing these valves with embodiments of the present invention may simplify the mechanisms, reduce cost, increase service life, and allow for improved chamber filling.

It is a still further object of some, but not necessarily all, embodiments of the present invention to replace valves in compressors and pumps. Embodiments of the present invention may provide reduce pumping losses and increase volume fill rates. Embodiments of the present invention also may increase pump and compressor service life. Embodiments of the present invention also may be more tolerant of suspended particles within the medium being pumped and/or compressed and tend to self-clean internal passages. Thus, embodiments of the present invention may be ideal for dirty water pumps or hydraulic pumps that may be used with a working fluid containing some grit.

These and other advantages of some, but not necessarily all, embodiments of the present invention will be apparent to those of ordinary skill in the art.

SUMMARY OF EMBODIMENTS OF THE INVENTION

Responsive to the foregoing challenges, Applicant has developed an innovative engine or pump comprising: a chamber having a chamber wall separating a chamber interior from a chamber exterior; a chamber port extending through the chamber wall to provide communication between the chamber interior and the chamber exterior; and a valve disposed proximal to the chamber port, said valve having one or more components having a stationary position relative to each other and relative to the chamber wall, and said valve being configured to control a flow of fluid, wherein the valve permits the flow of fluid from the chamber exterior to the chamber interior, wherein the valve substantially restricts the flow of fluid from the chamber interior to the chamber exterior, and wherein the one or more components of the valve remain in the stationary position relative to each other and relative to the chamber wall to permit the flow of fluid from the chamber exterior to the chamber interior and to substantially restrict the flow of fluid from the chamber interior to the chamber exterior.

Applicant has further developed an innovative engine or pump comprising: a chamber having a chamber wall separating a chamber interior from a chamber exterior; a chamber port extending through the chamber wall to provide communication between the chamber interior and the chamber exterior; and a valve disposed proximal to the chamber port, said valve having a transition nozzle, a funnel nozzle and a reverse flow blocker, wherein the valve permits the flow of fluid from the chamber exterior to the chamber interior, and wherein the valve substantially restricts the flow of fluid from the chamber interior to the chamber exterior.

Applicant has further developed an innovative pump comprising: a chamber having a chamber wall separating a chamber interior from a chamber exterior; a first chamber port extending through the chamber wall to provide communication between the chamber interior and the chamber exterior; a second chamber port extending through the chamber wall to provide communication between the chamber interior and the chamber exterior; a first valve disposed proximal to the first chamber port, said first valve having one or more components having a stationary position relative to each other and relative to the chamber wall, and said first valve being configured to control a flow of fluid; and a second valve disposed proximal to the second chamber port, said second valve having one or more components having a stationary position relative to each other and relative to the chamber wall, and said second valve being configured to control the flow of fluid, wherein the first valve permits the flow of fluid from the chamber exterior to the chamber interior, wherein the first valve substantially restricts the flow of fluid from the chamber interior to the chamber exterior, wherein the one or more components of the first valve remain in the stationary position relative to each other and relative to the chamber wall to permit the flow of fluid from the chamber exterior to the chamber interior and to substantially restrict the flow of fluid from the chamber interior to the chamber exterior, wherein the second valve permits the flow of fluid from the chamber interior to the chamber exterior, wherein the second valve substantially restricts the flow of fluid from the chamber exterior to the chamber interior, and wherein the one or more components of the second valve remain in the stationary position relative to each other and relative to the chamber wall to permit the flow of fluid from the chamber interior to the chamber exterior and to substantially restrict the flow of fluid from the chamber exterior to the chamber interior.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1A:
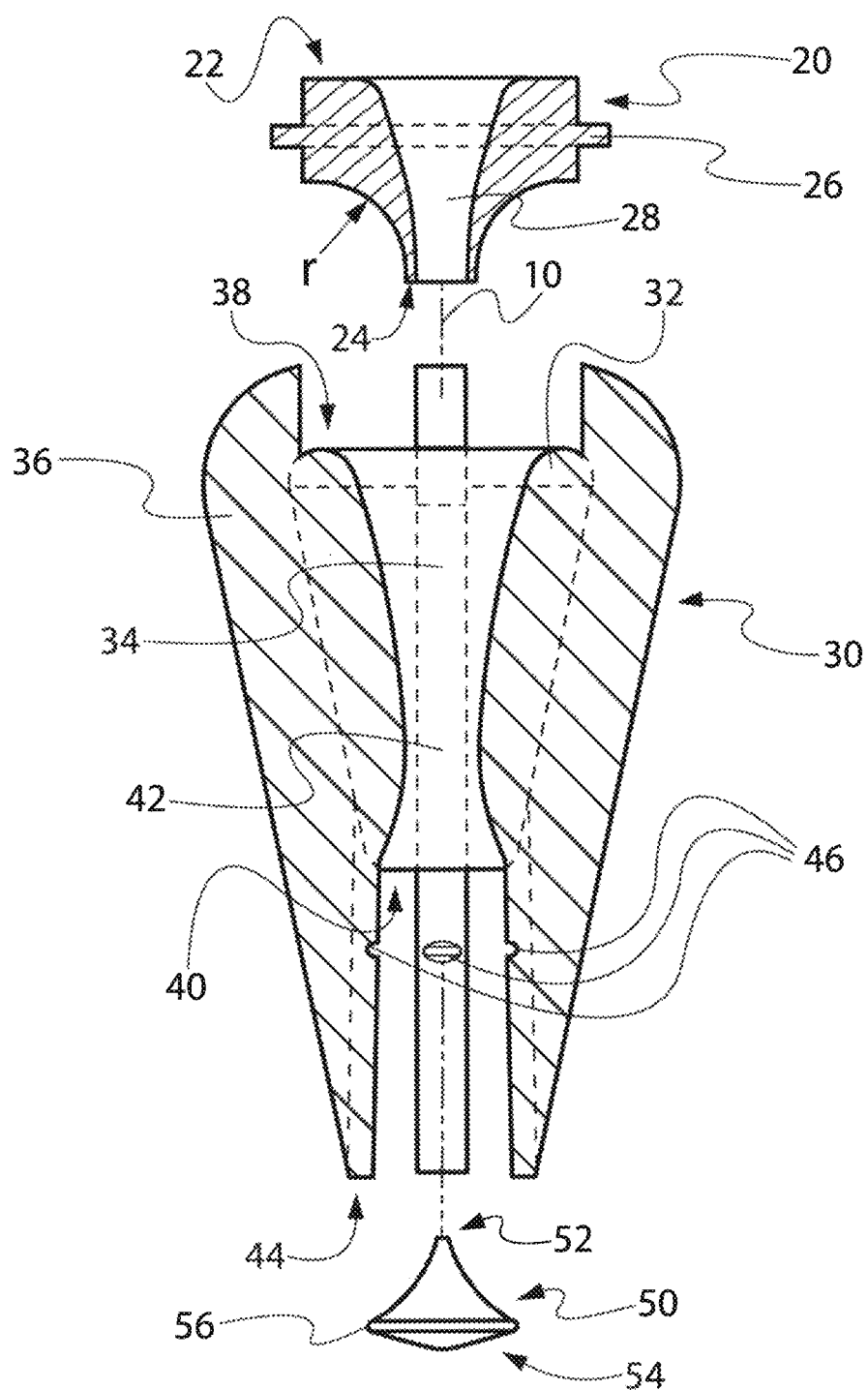
FIG. 1A is an exploded partial cross-sectional view of example embodiment of the interior components of a motionless one-way valve shown in FIG. 1B.

Reference will now be made in detail to embodiments of the present invention, examples of which are illustrated in the accompanying drawings. With reference to FIG. 1A, the interior components of an apparatus embodiment, in this case a motionless one-way valve, including a transition nozzle 20, a funnel nozzle 30, and a reverse flow blocker 50, are illustrated in an exploded view. The motionless one-way valve may further include a case 60, shown in FIG. 1B, surrounding the interior components of the valve.

Figure 1B:
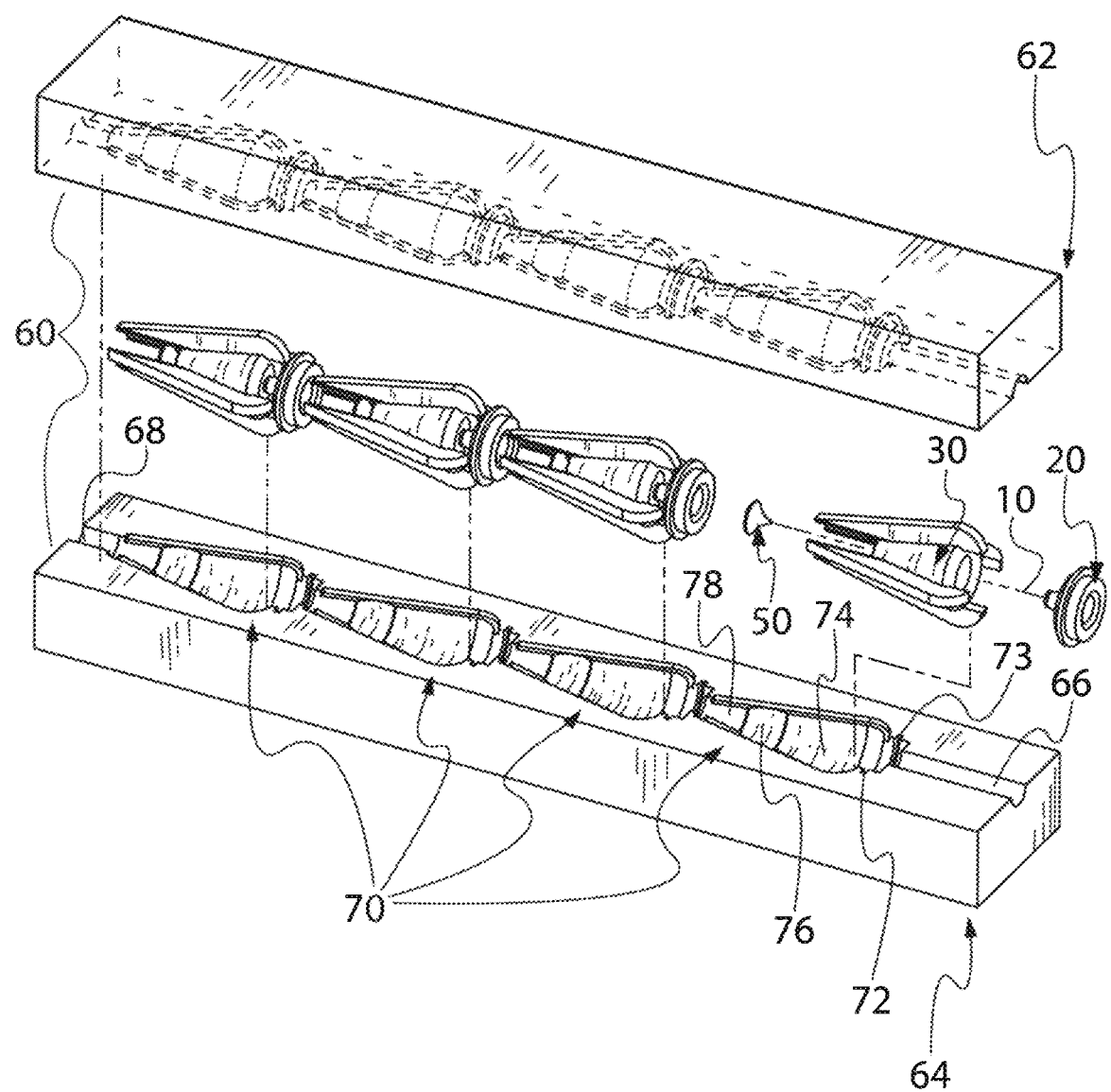
FIG. 1B is a partially exploded isometric view of an embodiment of a motionless one-way valve assembly.

With reference to FIGS. 1A and 1B, the transition nozzle 20 may have a generally cylindrical outer surface extending coaxially with a longitudinal axis 10 from a first end 22 towards a second end 24. At or near a mid-point between the first end 22 and the second end 24 of the transition nozzle, the outer surface of the transition nozzle may transition from a generally cylindrical shape to an inverse quarter-section torus shape. The inverse quarter-torus shape may extend from a point at or near the mid-point between the first end 22 and the second end 24 of the transition nozzle to the second end of the transition nozzle. The inverse quarter-torus shape may be oriented such that the longitudinal axis 10 intersects its center. The inverse quarter-torus shape of the transition nozzle 20 second end 24 may have a toroidal radius of curvature r that results in the curved wall of the second end arcing through about ninety (90) degrees. A funnel-shaped first passage 28 may extend through the center of the transition nozzle 20 between the first end 22 and the second end 24. The first passage 28 may have a maximum diameter at the first end 22, and a minimum diameter near or at the second end 24, and may transition smoothly as a slightly curved surface between the two ends of the transition nozzle 20. A locating boss 26, preferably ring shaped, may extend away from the outer cylindrical surface of the transition nozzle 20.

The funnel nozzle 30 may include a generally funnel-shaped inner body 32 defining a generally funnel-shaped second passage 34, and a plurality of fins 36 extending outward from the inner body. The inner body 32 may be formed from a generally frusto-conical ring-shaped wall extending co-axially with the longitudinal axis 10. The ring-shaped wall may have a rounded or half-torus leading edge at the first end 38 of the inner body 32, and a tapered trailing edge at the second end 40 of the inner body. The overall shape of the inner body 32 also may be tapered such that its outer surface decreases in diameter generally evenly between a first end 38 and a second end 40. The inner surface of the inner body 32 ring-shaped wall defines the second passage 34. The diameter of the second passage 34, which is coaxial with the longitudinal axis 10, may vary between the first end 38 and the second end 40 of the inner body 32. Preferably, the inner wall surface defining the second passage 34 curves gently between the first end 38 and the second end 40 of the inner body. The second passage may have a maximum diameter at the first end 38 and a minimum diameter at a throat portion 42 located closer to the second end 40 of the inner body 32 than the first end 38 along the longitudinal axis 10. The second passage 34 may flare progressively between the throat portion 42 and the second end 40 of the inner body 32 such that the wall surface defining the second passage intersects the outer surface of the inner body 32 at the second end of the inner body to provide a tapered trailing edge.

Two or more fins 36 may be provided adjacent to the outer surface of the inner body 32. In the example illustrated by FIG. 1A, four fins 36, evenly spaced from each other circumferentially about the longitudinal axis 10, surround the inner body 32. Preferably, but not necessarily, the fins 36 may be fixed to the inner body 32 using any suitable means, such as via a weld, bond, adhesive, snap fit, slot and key, screw, or the like. The fins 36 may each extend generally longitudinally in a plane collinear with the longitudinal axis 10. Each fin 36, when viewed from the side as shown in FIG. 1A, may have a rounded outer leading edge and a flat inner edge collinear with the longitudinal axis 10 extending away from the first end 38 of the inner body 32 towards the transition nozzle 20. Preferably, the rounded outer leading edge of each fin 36 arcs through approximately ninety (90) degrees, and generally defines a quarter-torus shape oriented such that its center is intersected by the longitudinal axis 10. Preferably, the radius of curvature of the quarter-torus shape of each fin 36 leading edge is the same or similar to the radius of curvature r of the quarter-torus shape of the second end 24 of the transition nozzle 20. The portion of the fins 36 that surround the inner body 32 may taper inward evenly along both the outer edge and the inner edge between the fin leading edge at the first end 38 and the second end 40 of the inner body 32, relative to the longitudinal axis 10. The outer edge of each fin 36 may continue to taper to the same degree beyond the second end 40 of the inner body 32 to a fin trailing edge 44. The inner edge of each fin 36, however, may be spaced a constant distance from the longitudinal axis 10 between the second end 40 of the inner body 32 and the fin trailing edge 44, thereby producing fins with decreasing width between the second end of the inner body and the fin trailing edge. Preferably, the fins 36 may taper inward in the range of 10 to 15 degrees relative to the longitudinal axis 10. Each fin 36 may include a groove 46 formed in the fin inner edge beyond the second end 40 of the inner body 32. The grooves 46 may be coplanar with a plane perpendicular to the longitudinal axis 10.

The reverse flow blocker 50 may extend along the longitudinal axis 10 between an upper portion 52 and a lower portion 54. The reverse flow blocker 50 preferably has a circular cross-section at all points along the longitudinal axis 10. The upper portion 52 of the reverse flow blocker 50 may meet the lower portion 54 at a girdle 56. The upper portion 52 may have a generally gently curved-wall conical shape, transitioning from a narrow tip at the end proximal to the funnel nozzle 30 to a wider base at the girdle 56. The lower portion 54 of the reverse flow blocker 50 may be generally cone shaped, transitioning from a widest point at the girdle 56 to a lower-most tip. The girdle 56 may be designed to fit securely in the grooves 46 provided in the fins 36. The reverse flow blocker 50 may be disposed between the fins 36 by snapping the girdle 56 into the grooves 46. The diameter of the girdle 56 is preferably greater than the diameter of the second passage 34 of the inner body 32 at the second end 40.

With reference to FIG. 1B, the case 60 may be constructed from mating first and second shells 62 and 64, which include hollow interiors that are generally mirror images of each other. When assembled together as a case 60, the hollow interiors of the shells 62 and 64 may define a series of one or more interconnected cavities 70 extending between a first port 66 and a second port 68. The first port 66 and the second port 68 may provide working fluid access to the series of interconnected cavities 70. Each cavity 70 in the assembled case 60 receives the interior components of a motionless one-way valve (i.e., transition nozzle 20, funnel nozzle 30 and reverse flow blocker 50). Accordingly, each cavity 70 may include a transition nozzle opening 72, a funnel nozzle opening 74, a reverse flow blocker opening 76, and a fin trailing edge opening 78. The fin trailing edge opening 78 of the first cavity 70 may communicate with the transition nozzle opening 72 of the second cavity, and this pattern may repeat for each successive cavity in the series. It is appreciated that various embodiments of the invention may include any number of cavities in series, or only a single cavity.

With reference to FIGS. 1A and 1B, the transition nozzle opening 72 is shaped to receive the transition nozzle 20 securely in a manner that primarily blocks a working fluid from flowing around the outer surface of the transition nozzle, and primarily directs the working fluid to flow through the first passage 28 in the transition nozzle. The transition nozzle opening 72 may include a locating boss recess 80 configured to receive the locating boss 26 provided on the transition nozzle 20. The locating boss recess 80 and the locating boss 26 may cooperate to locate the transition nozzle 20 relative to the funnel nozzle opening 74 and the funnel nozzle 30.

Relative to the longitudinal axis 10 and the funnel nozzle 30, the funnel nozzle opening 74 extends from the leading edge of the fins 36 to about the second end 40 of the inner body 32. The funnel nozzle opening 74 is shaped to receive the upper portion of the funnel nozzle 30. More specifically, the wall of the funnel nozzle opening 74 generally follows the shape of the outer edges of the fins 36 between the fin leading edges and second end 40 of the inner body 32. When the funnel nozzle 30 is properly positioned within the funnel nozzle opening 74, the fins 36 effectively suspend the inner body 32 in the center of the funnel nozzle opening.

Relative to the longitudinal axis 10 and the funnel nozzle 30, the reverse flow blocker opening 76 extends from about the second end 40 of the inner body 32 to a point between the reverse flow blocker 50 and the trailing edge of the fins 36. The wall of the reverse flow blocker opening 76 may be slightly curved outward or concave to guide flow of the working fluid exiting the funnel nozzle 30 around the reverse flow blocker 50. The fins 36 suspend the reverse flow blocker 50 in the center of reverse flow blocker opening 76.

The fin trailing edge opening 78 extends from a point between the reverse flow blocker 50 and the trailing edge of the fins 36 to the terminus of the fins relative to the longitudinal axis 10 and the funnel nozzle 30. The wall of the fin trailing edge opening 78 generally follows the shape of the outer edges of the fins 36. The diameter of the fin trailing edge opening 78 at the terminus of the fins 36 is preferably the same or about the same as the diameter of the first passage 28 at the first end 22 of the transition nozzle 20.

When the transition nozzle 20 is seated with the locating boss 26 in the locating boss recess 80, the second end 24 of the transition nozzle may be suspended within the second passage 34 of the inner body 32. As a result, a ring-shaped opening may be formed between (i) the outer surface of the second end 24 of the transition nozzle 20 and (ii) the inner body 32. The transition nozzle 20 may also be located relative to the funnel nozzle opening 74 such that the inverse quarter-torus shape of the bottom of the transition nozzle forms a nearly smooth continuous curved wall extending from the quarter-torus shape of the wall of the funnel nozzle opening 74 surrounding the leading edge of the fins 36. The abutment of the quarter-torus wall of the funnel nozzle opening 74 with the quarter-torus shape of the second end 24 of the transition nozzle 20 results in a relatively continuous smooth half-torus shaped wall of nearly constant radius of curvature through about 180 degrees of curvature, or slightly more.

Figure 1C:
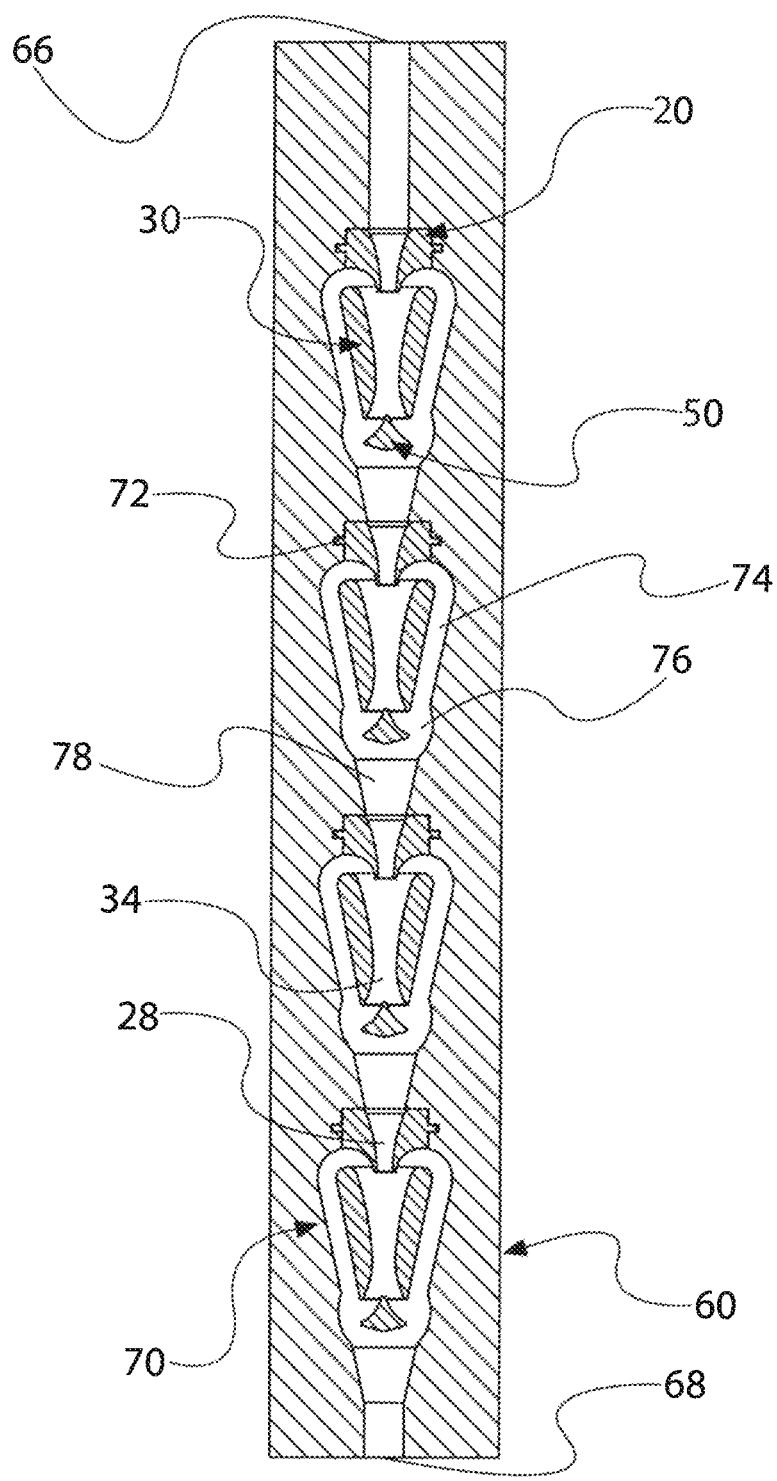
FIG. 1C is a cross-sectional view of the motionless one-way valve assembly embodiment of FIG. 1B taken along a cut that that excludes the funnel nozzle fins for clarity.

FIG. 1C is a cross-sectional view of the case 60, the cavities 70, and the interior components of the motionless one-way valve transition nozzle 20, funnel nozzle 30 and reverse flow blocker 50) shown in FIGS. 1A and 1B taken across a cut-line that does not include the fins 36. The open areas shown in FIG. 1C may accommodate the flow of a working fluid between the first port 66 and the second port 68. The cavities 70 and the interior components of the one-way valve cooperate to permit the forward flow of fluid from the first port 66 to the second port 68, and to resist or prevent the flow of fluid in the reverse direction, i.e., from the second port 68 to the first port 66.

Figure 2:
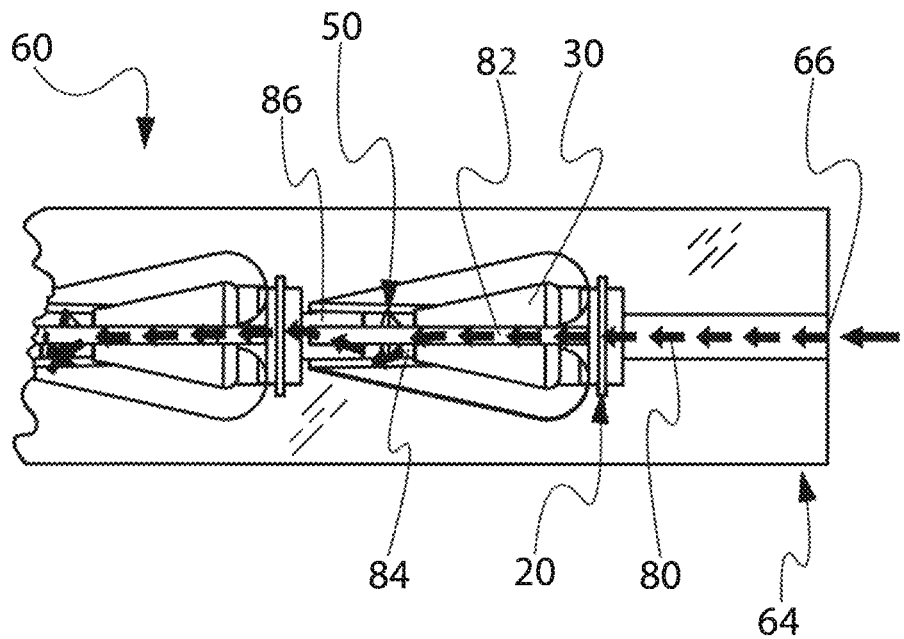
FIG. 2A is a plan-view illustration of a typical forward-flow path for the embodiment of FIG. 1B.
FIG. 2B is a plan-view illustration of two typical counter-flow paths for the embodiment of FIG. 1B.
Figure 2:
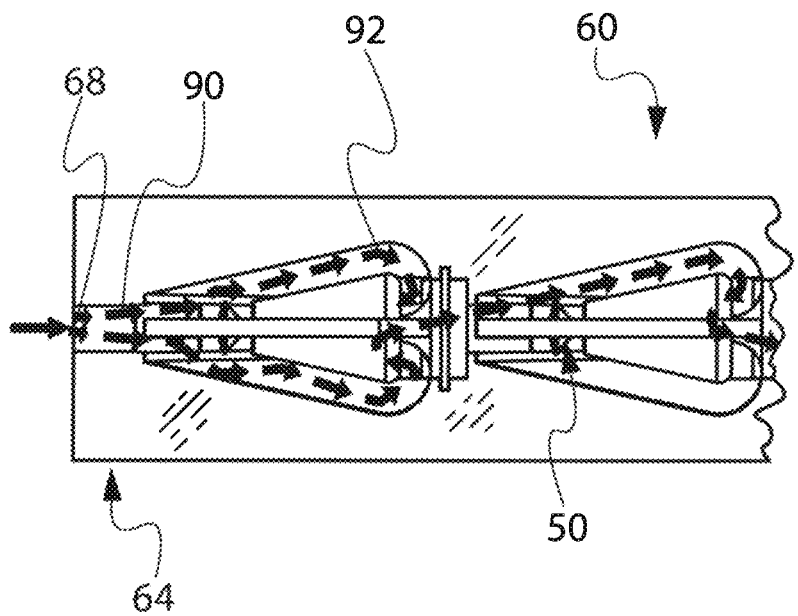

The interior components disposed in a portion of the second shell 64 are shown in FIG. 2A to illustrate the forward flow of fluid. With reference to FIGS. 1A, 1B and 2A, forward fluid flow along path 80 may occur when fluid pressure at the first port 66 is greater than pressure at the second port 68. The example forward flow path 80 extends along the primary central flow path 82 through the transition nozzle 20 and the funnel nozzle 30, and passes through the flow divergent area 84 and the flow convergent area 86 created by the reverse flow blocker 50. More specifically, the working fluid first flows into the transition nozzle 20 where the decreasing diameter of the first passage 28 may cause the velocity of the flow to increase and affect the pressure and temperature of the fluid. The first passage 28 may focus the working fluid into a laminar flow stream. The working fluid exits the transition nozzle 20 and enters the second passage 34 in the inner body 32 of the funnel nozzle 30. The shape of the second passage 34 may refocus the working fluid into a laminar flow as it passes through the throat portion 42. After passing through the throat portion 42, the working fluid may expand in the widening diameter area of the second passage 34 near the second end 40 of the inner body 32. After exiting the inner body 32, the working fluid is forced into a divergent flow around the reverse flow blocker 50 by the upper portion 52 of the reverse flow blocker. After the fluid flow passes the reverse flow blocker 50 girdle 56, the gentle curve on the lower portion 54 of the reverse flow blocker 50 may induce a Coanda Effect which causes the working fluid to cling to the curved surface and pass through the center of the fin trailing edge opening 78. Some of the working fluid also may be directed inward by the curved surface of the reverse flow blocker opening 76. A convergent fluid flow may result beyond the lower portion 54 of the reverse flow blocker 50, extending towards the next cavity 70 in the motionless one-way valve. This manner of forward fluid flow may be repeated for each cavity in the valve case.

Reverse fluid flow from the second port 68 to the first port 66 of the case 60, and its limitation or prevention, is explained with reference to FIGS. 1A, 1B and 2B. When the pressure at the second port 68 exceeds that at the first port 66, the fluid flow in the case 60 may conform, or attempt to conform, to flow path 90. The working fluid attempts to flow through the fin trailing edge opening 78 into the reverse flow blocker opening 76 where the working fluid encounters the sharply sloped surface on the lower portion 54 of the reverse flow blocker 50. Since the lower portion 54 is sharply sloped, it does not induce a Coanda Effect and the working fluid does not smoothly follow the surface. Because the diameter of the reverse flow blocker 50 girdle 56 is approximately as great or greater than the diameter of the second passage 34 of the inner body 32 at the second end 40, the sharply sloped lower portion 54 acts like a ramp and directs working fluid to flow around the outside of the inner body 32. As a result, working fluid enters the counter-flow area 92 between the wall of each cavity 70 and the outside surface of the inner body 32. Working fluid exiting the counter-flow area 92 may be forced to turn approximately one-hundred-eighty (180) degrees by the half-torus shaped wall formed by the quarter-torus wall of the funnel nozzle opening 74 and the quarter-torus shape of the second end 24 of the transition nozzle 20. The working fluid is diverted into the second passage 34 of the inner body 32 back towards the reverse flow blocker 50. Fluid particles may tend to accumulate around the outside surface of the transition nozzle 20 during counter-flow due to localized rapid fire ricochets which generate turbulence and deplete particle velocity causing some particle stagnation.

The internal shapes of the transition nozzle 20 first passage 28 and the funnel nozzle 30 second passage 34 generally resemble de Laval nozzles, modified to further include a fluid space between the outer surface of the second end 24 of the transition nozzle 20 and the surface of the second passage 34 in the inner body 32. This additional fluid space preferably has a decreasing cross-sectional area in the direction it extends along the longitudinal axis 10 towards the reverse flow blocker 50 which may tend to accelerate the flow velocity of the working fluid flow exiting the counter-flow area 92 during reverse flow conditions. This may tend to induce a Venturi effect for working fluid in the first passage 28 of the transition nozzle 20. When the system transitions to forward fluid flow conditions, the Venturi effect also may pull stagnated particles from the counter-flow area 92 into the second passage 34.

During counter-flow conditions, some of the working fluid may ricochet through the transition nozzle 20 first passage 28. However, by providing a plurality of motionless one-way valve cavities 70 in sequence, as shown in FIG. 1B, the amount of working fluid counter-flow and counter-flow pressure decreases with each successive cavity. Therefore, the sealing action the reverse flow may be more complete going backward through the chain of cavities through which the working fluid attempts to pass. As a result, the motionless one-way valve creates a sealing action for reverse flow with minimal leakage. It is appreciated that the pressure differential across the series of cavities 70 may inversely affect the effective duration of the sealing action and directly affects the leakage rate, which also increases with time.

Figure 10:
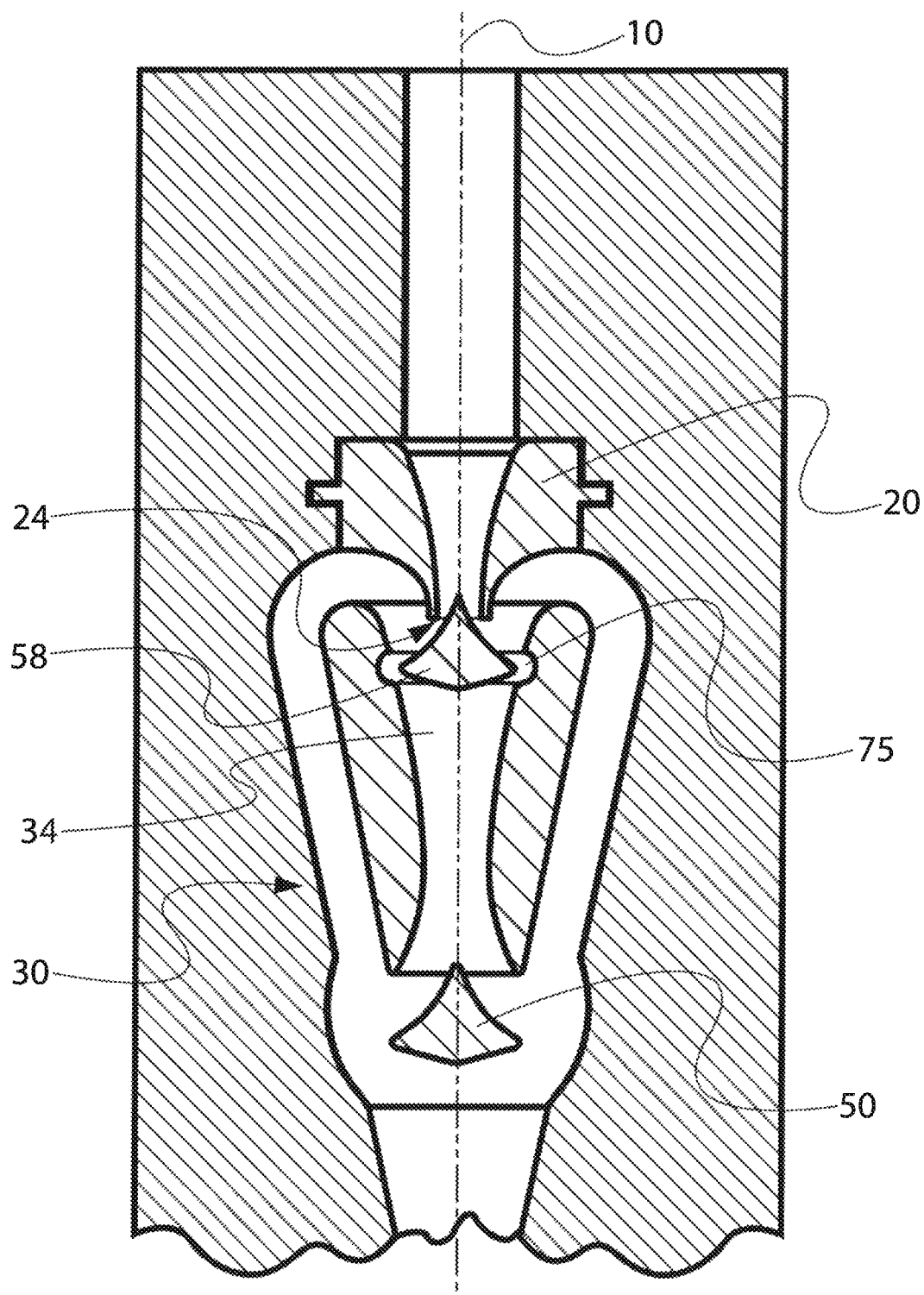
FIG. 10 is a cross-sectional view of an alternative embodiment of the invention which includes a secondary reverse flow blocker.
Figure 11:
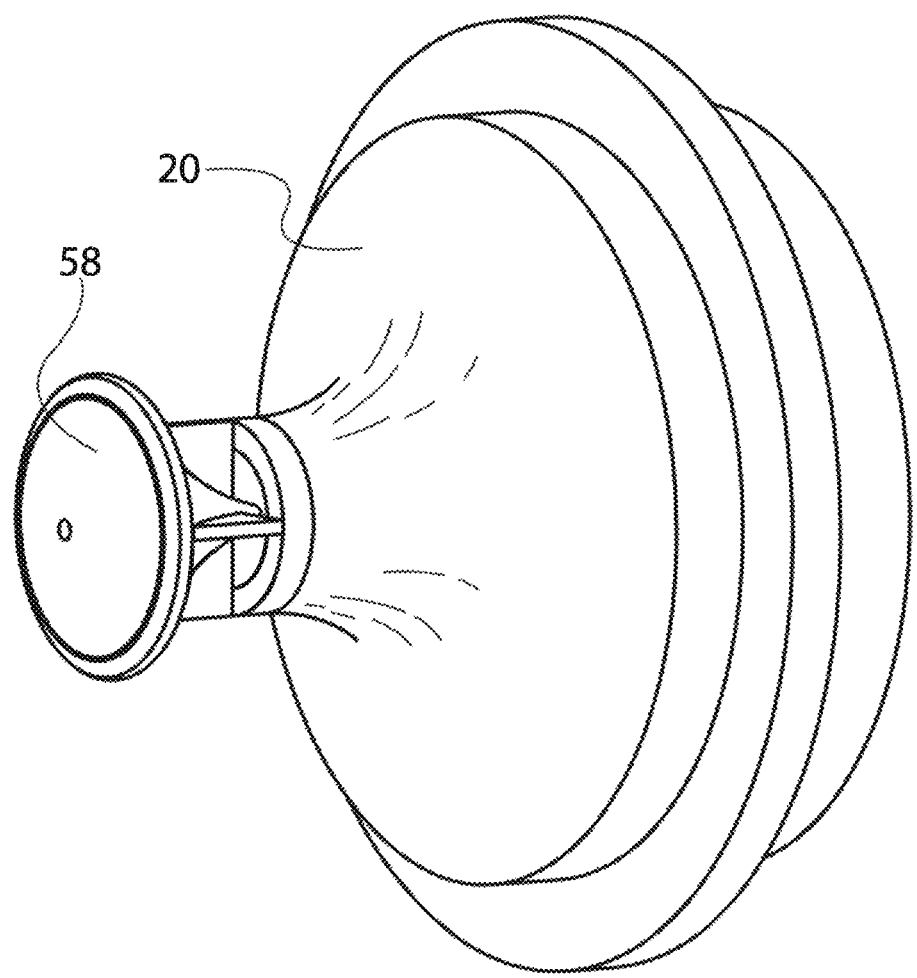
FIG. 11 is a pictorial view of a single piece transition nozzle and secondary reverse flow blocker which may be used in an alternative embodiment of the invention.

An alternative embodiment of the invention is illustrated in FIG. 10, which embodiment includes an additional optional secondary reverse flow blocker 58 and an additional optional auxiliary flow cavity 75. As shown in FIG. 11, the secondary reverse flow blocker 58 may be integrated with the transition nozzle 20 by connecting fins. The secondary reverse flow blocker 58 may be centered along the longitudinal axis 10 of the second end 24 of the transition nozzle 20. The secondary reverse flow blocker 58 may function in the same manner as the previously described reverse flow blocker with flows around the secondary reverse flow blocker girdle utilizing the optional auxiliary flow opening 75 formed on the inside of the second passage 34 in the funnel nozzle 30.

Figure 3:
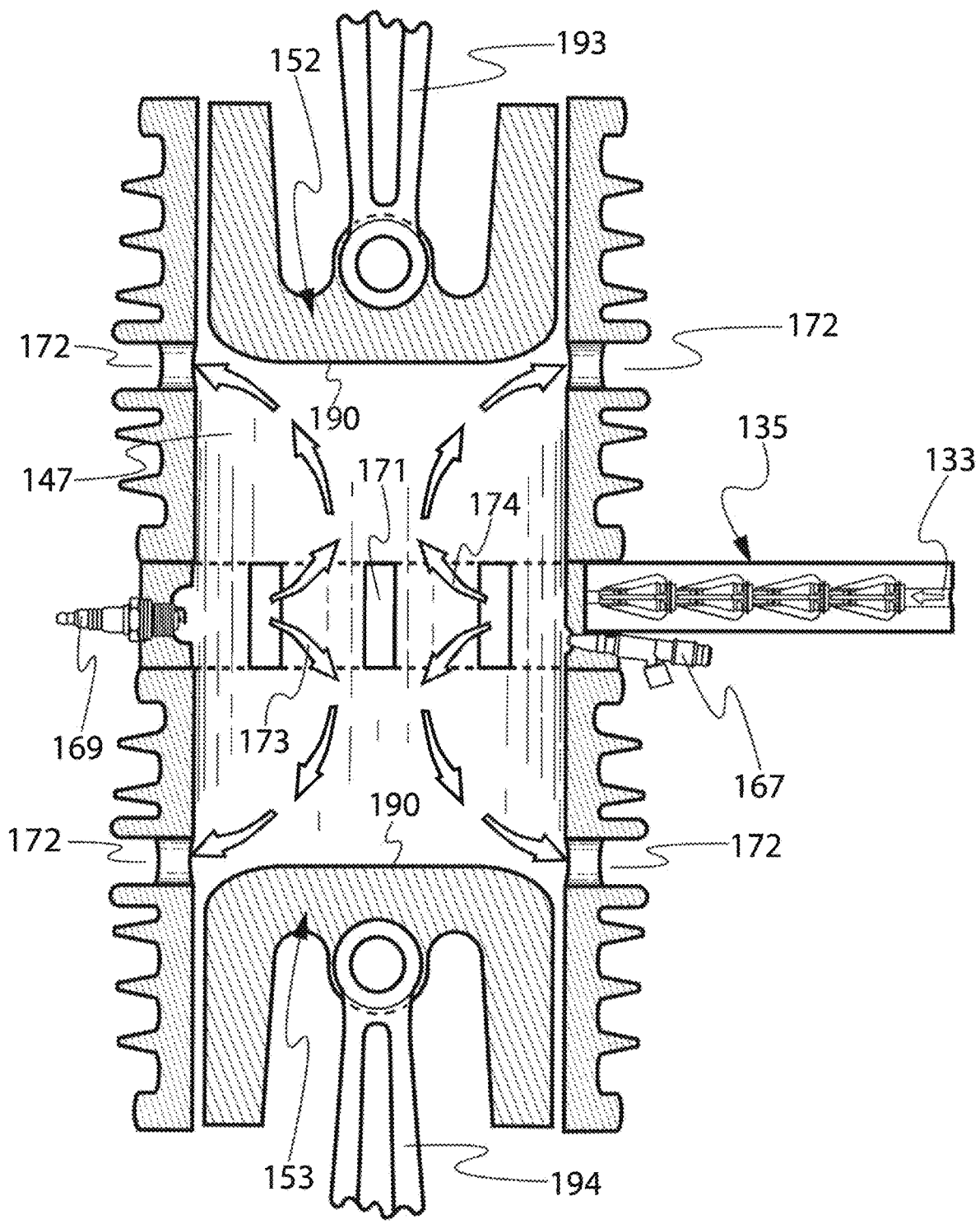
FIG. 3A is a cross-sectional view of a first opposing piston two-stroke internal combustion engine embodiment of the invention incorporating a motionless one-way valve.
FIG. 3B is a cross-sectional view of a second opposing piston two-stroke internal combustion engine embodiment of the invention incorporating a motionless one-way valve.
Figure 3:
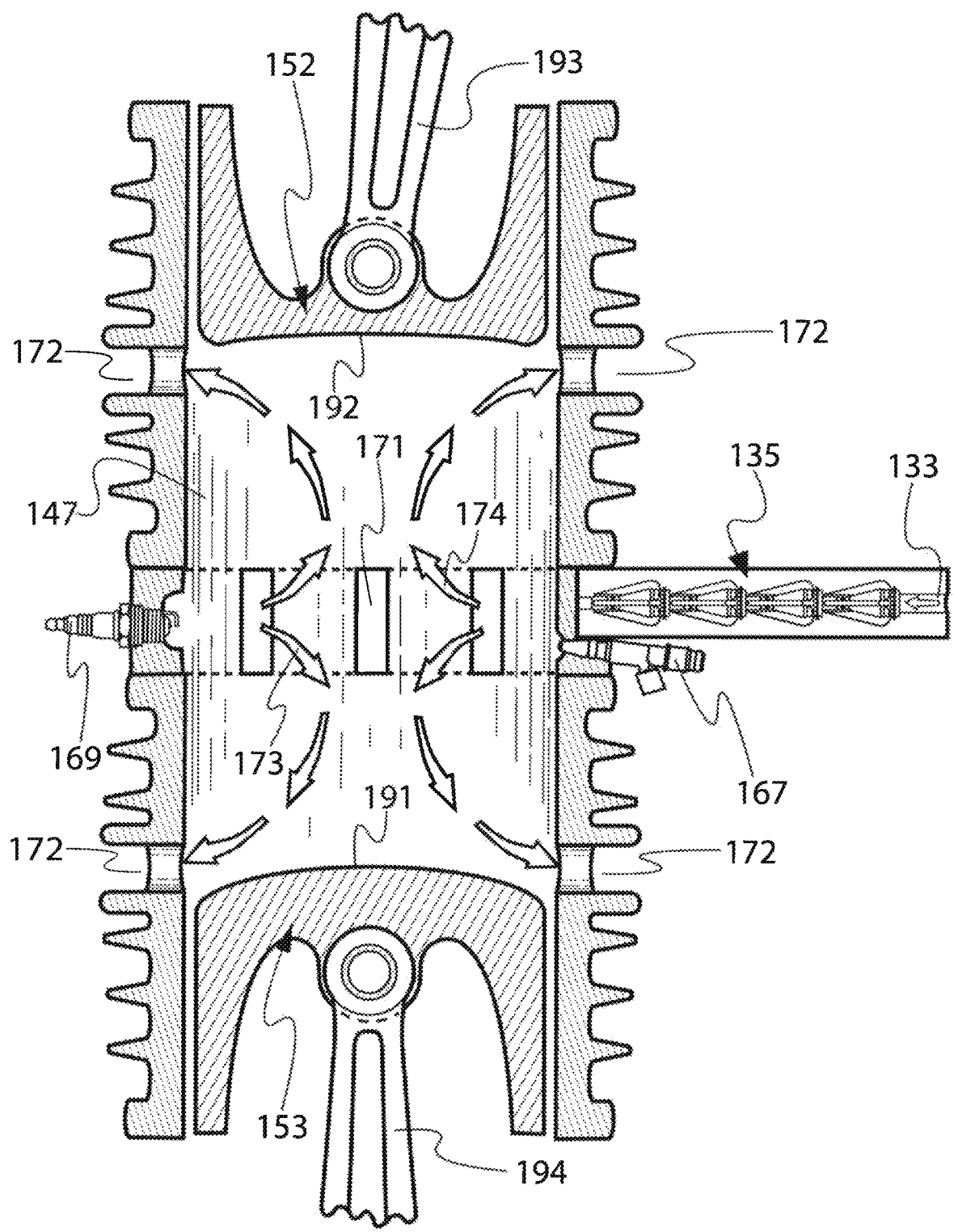

Embodiments of the motionless one-way valve may be used in internal combustion engines and pumps, among other apparatus. For example, with reference to FIGS. 3A and 3B, a motionless one-way valve assembly 135 may be used to supply air through an input port 133 to a two-stroke internal combustion engine combustion chamber 147 for improved scavenging. FIG. 3A illustrates a two-stroke opposing piston implementation with equal stroke and identical piston heads 190 provided on a first piston 152 disposed opposite of a second piston 153. FIG. 3B illustrates a two-stroke opposing piston implementation with complementary concave domed piston head 192 and convex domed piston head 191, provided on a first piston 152 disposed opposite of a second piston 153, respectively. With regard to both the FIG. 3A and FIG. 3B embodiments, the first and second pistons 152 and 153 may be connected by respective connecting rods 193 and 194 to crankshafts (not shown). The motionless one-way valve assembly 135 may supply air through a generally cylindrical intake passage to one or more sidewall fresh air/charge ports 171 disposed about the middle of the combustion chamber 147. Fuel may be supplied to the combustion chamber 147 via a direct injector 167 and the charge may be ignited at the appropriate time by the sparkplug 169 or by the compression itself. During an expansion stroke (shown), the first piston 152 and the second piston 153 may translate away from the center of the combustion chamber 147, generating usable work. At this time, the exhaust gasses may be driven out of the wall based exhaust ports 172 when the pistons are near minimum stroke. These exhaust gasses may be driven from the chamber along scavenging flow lines 173 and 174, for example.

Figure 4:
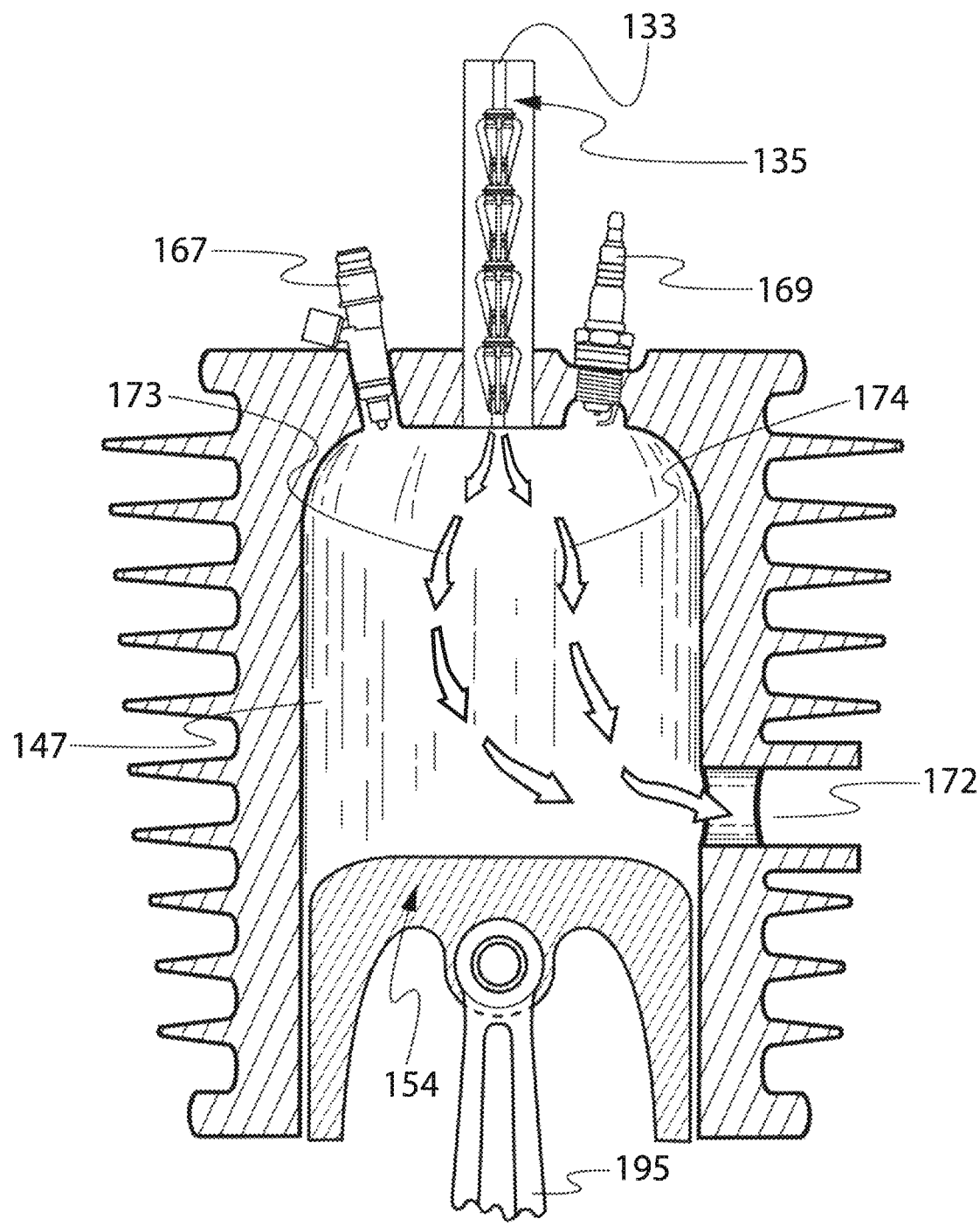
FIG. 4 is a cross-sectional view of a first reverse uniflow type two-stroke internal combustion engine embodiment of the invention incorporating a motionless one-way valve.

In another engine embodiment, illustrated by FIG. 4, an example two-stroke engine with reverse uniflow scavenging is presented. Fresh or pre-compressed air/charge may be provided from an input port 133 through a motionless one-way valve assembly 135 to the top of the combustion chamber 147. When air is drawn into the combustion chamber 147, or during appropriate conditions, fuel may be supplied by a direct injector 167. A sparkplug 169 or the compression itself may ignite the mixture and push the piston 154 downwards to drive the connecting rod 195 and generate usable work. Once the piston 154 is near minimum stroke, a wall based exhaust port 172 is revealed to release the exhaust gases and provide scavenging flow from the top of the cylinder along scavenging flow line 173 and scavenging flow line 174, for example. This may provide repeated scavenging of the gases, but still provide some useful buffering of the next charge cycle to reduce emissions by allowing a small portion of the exhaust gases to remain.

Figure 5:
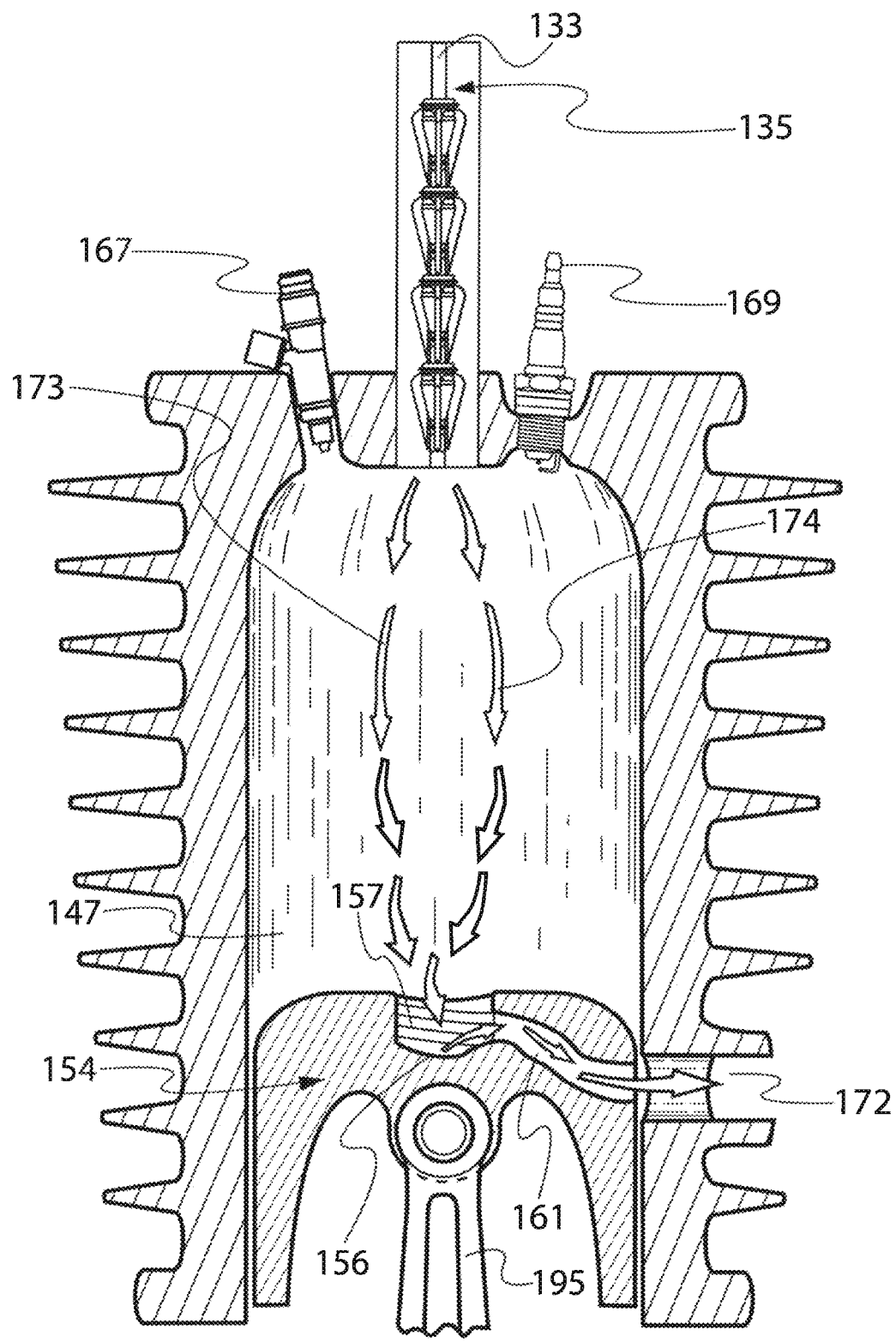
FIG. 5 is a cross-sectional view of a second reverse uniflow type two-stroke internal combustion engine embodiment of the invention incorporating a motionless one-way valve.

In yet another engine embodiment, illustrated by FIG. 5, an example two-stroke engine with reverse uniflow scavenging utilizing a piston based chamber and passage is presented. The piston 154 may include a passage extending therethrough including an opening having swirl ribs 157, a pan area 156 and an exhaust channel 161. Fresh or pre-compressed air/charge may be provided from an input port 133 through a motionless one-way valve assembly 135 to the top of the combustion chamber 147. When air is drawn into the combustion chamber 147, or during appropriate conditions, fuel may be supplied by a direct injector 167. A direct injector configuration may effectively utilize the swirl ribs 157 and the pan area 156 as an elevated temperature area or a catalytic coated area within the piston 154 to assist in fuel vaporizing, fuel/air mixing, and possibly beginning pre-combustion chemical reactions. A sparkplug 169 or the compression itself may ignite the mixture and push the piston 154 downward to drive the connecting rod 195 and generate usable work. Once the piston 154 is near minimum stroke, a wall based exhaust port 172 may align with the exhaust channel 161 within the piston 154 causing exhaust gases to exit the combustion chamber 147. The exiting exhaust gases may be swirled by the swirl ribs 157 to create a more efficient scavenging flow from the top of the cylinder along scavenging flow line 173 and scavenging flow line 174, for example. This may provide improved scavenging of the gases into higher RPM ranges with slightly less exhaust gas buffering of the next charge cycle to reduce emissions and increase engine power output by allowing more usable air and fuel to be loaded with the next charge.

Figure 6:
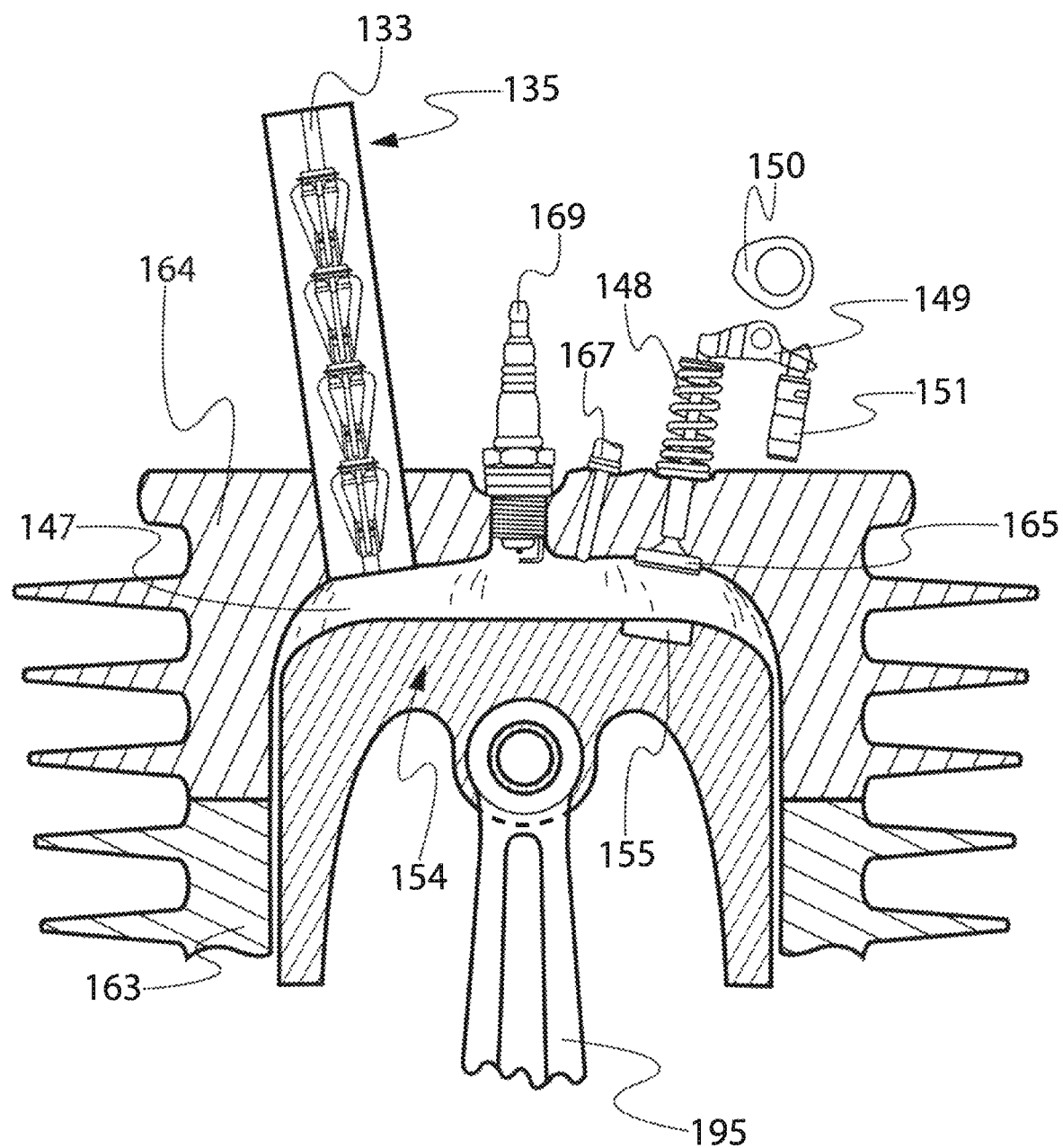
FIG. 6A is a cross-sectional view of a first four-stroke internal combustion engine embodiment of the invention incorporating a motionless one-way valve.
FIG. 6B is a cross-sectional view of a second four-stroke internal combustion engine embodiment of the invention incorporating a motionless one-way valve.
Figure 6:
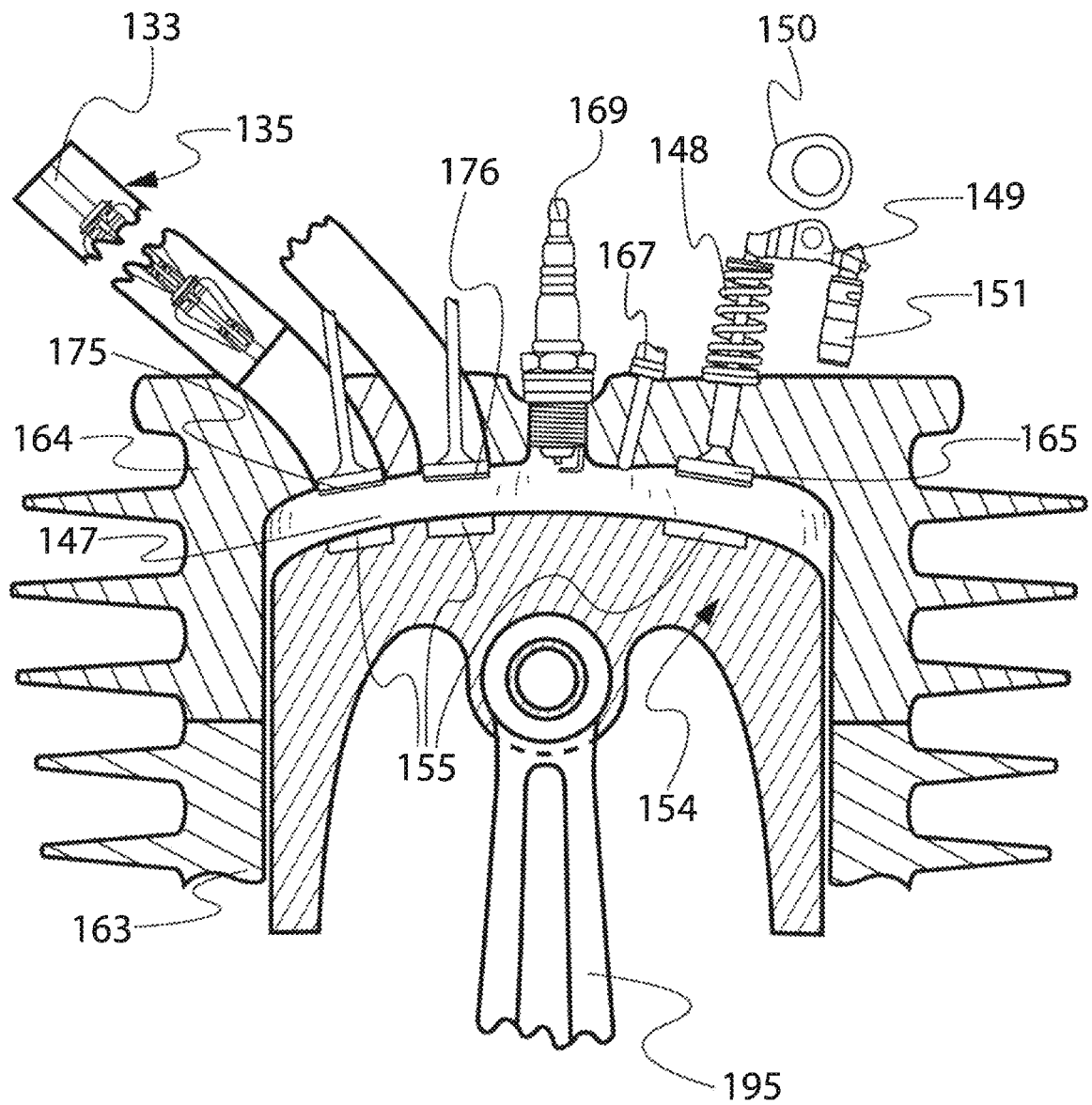

In another engine embodiment, illustrated in FIG. 6A, an example four-stroke engine utilizing a motionless one-way valve is presented. Air/charge may flow from an input port 133 through a motionless one-way valve assembly 135 located in the head 164 mounted on the engine block 163. Fresh or pre-compressed air/charge may be drawn through the valve assembly 135 into the combustion chamber 147 as the piston 154 descends further into the engine block 163. As the piston 154 rebounds after passing bottom dead center position, it begins to compress the air/charge in the combustion chamber 147. This causes the motionless one-way valve assembly 135 to block the escape of the charge from the combustion chamber 147. The charge may include fuel supplied by a direct injector 167. A sparkplug 169 or the compression itself may ignite the mixture around top dead center position and push the piston 154 downward to drive the connecting rod 195 and generate usable work. As the piston 154 nears bottom dead center position, an exhaust valve assembly, including for example a camshaft 150, a cam follower 149 and a hydraulic lifter 151, may open an exhaust valve 165 against the bias of a valve spring 148 and the combustion chamber 147 pressure to allow exhaust gases to exit the combustion chamber. A piston relief pocket 155 may be provided to assure that the piston 154 and the exhaust valve 165 do not collide.

In another engine embodiment, illustrated in FIG. 6B, an example four-stroke engine utilizing a motionless one-way valve provided in series with a first intake valve 175 and in parallel with a second intake valve 176 is presented. Air/charge may flow into the combustion chamber 147 from an input port 133 through a motionless one-way valve assembly 135 and the first poppet valve 175 located in the head 164 mounted on the engine block 163. Air/charge may also flow independently into the combustion chamber 147 through the second intake valve 176. Computer assisted variable valve control may be used to coordinate the actuation of the first and second intake valves 175 and 176. The combustion chamber 147 charge may include fuel supplied by a direct injector 167. A sparkplug 169 or the compression itself may ignite the mixture around top dead center position and push the piston 154 downward to drive the connecting rod 195 and generate usable work. As the piston 154 nears bottom dead center position, an exhaust valve assembly, including for example a camshaft 150, a cam follower 149 and a hydraulic lifter 151, may open an exhaust valve 165 against the bias of a valve spring 148 and the combustion chamber 147 pressure to allow exhaust gases to exit the combustion chamber. Piston relief pockets 155 may be provided to assure that the piston 154 does not collide with the first and second intake valves 175 and 176, or the exhaust valve 165.

With continued reference to FIG. 6B, during low RPM positive power operation, the first intake valve 175 is opened and closed like a traditional poppet valve, allowing the poppet valve to provide the sealing action during compression and expansion. During high RPMs, the first intake valve 175 may be held open, allowing the motionless one-way assembly 135 to provide the sealing action during compression and expansion. The parallel second intake valve 176 may open and close like a traditional poppet valve application during heavy load conditions and/or high RPM conditions to provide additional air/charge to the combustion chamber 147. The parallel second intake valve 176 may also be opened similar to traditional poppet valve applications, but with a delay and/or less lift during low RPM conditions to provide increased turbulence to improve combustion efficiency. The parallel second intake valve 176 may also be delayed in closing to decrease the compression ratio and/or to change the volumetric ratio of the compression and expansion phases of the engine operation by allowing controlled counter-flow into the intake manifold to provide a modified Atkinson cycle operation. This may allow increased light load and/or low RPM efficiencies, which may be desirable in automotive applications such as in hybrid vehicles.

Figure 7:
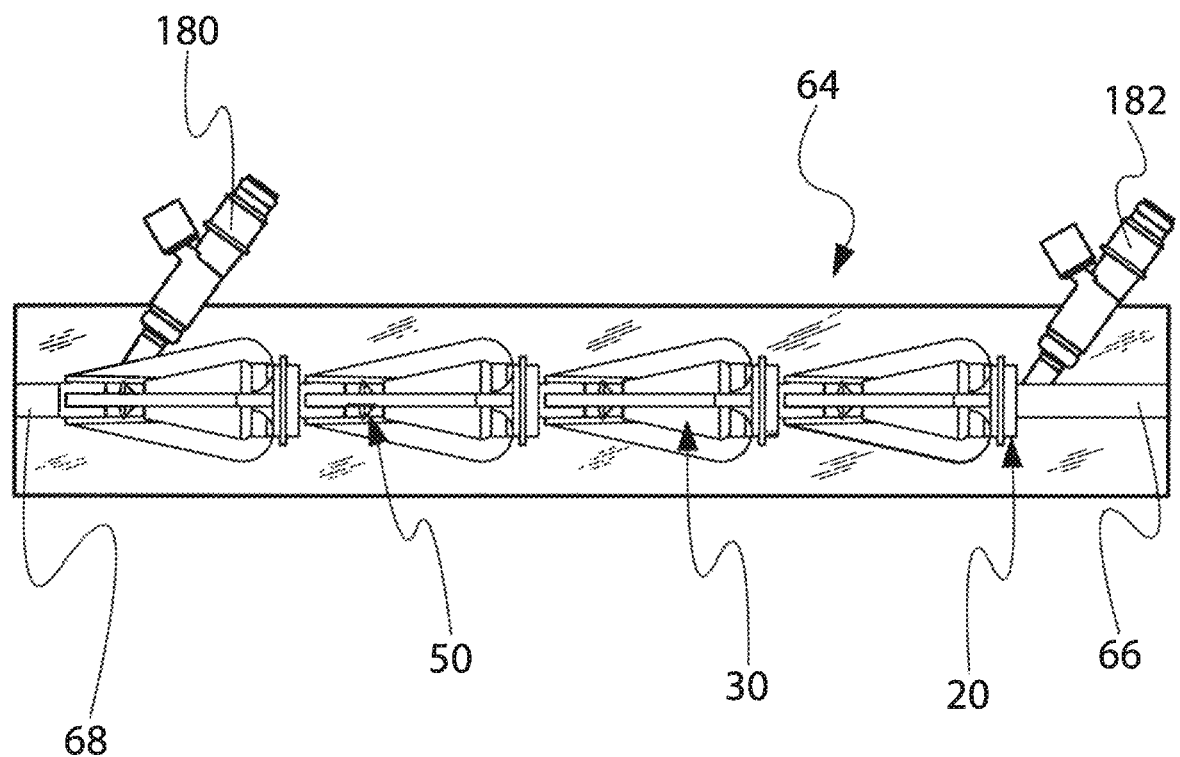
FIG. 7 is a partial cross-sectional view of a motionless one-way valve embodiment of the invention equipped with substance injectors.

FIG. 7 illustrates a motionless one-way valve assembly embodiment which includes a high-pressure substance injector 180 and a low pressure substance injector 182. In other respects, the FIG. 7 embodiment is like that of FIGS. 1A, 1B, and 1C, including a shell 64, first and second ports 66 and 68, transition nozzles 20, funnel nozzles 30 and reverse flow blockers 50. The high-pressure injector 180 may inject a substance at an angle into the forward-flow stream as it passes through the valve sub-section. Depending upon the spray pattern and the implemented location, this may provide necessary internal cooling to the motionless one-way valve. This cooling may prevent pre-ignition in engine embodiments, and also may assist in vaporizing the injected fluid as it enters the combustion chamber. It is also possible to integrate a low-pressure injector 182. It should also be noted that the example applications presented here employ direct and port injection, but the motionless one-way valve assemblies disclosed herein also may be applied to fogging/misting nozzles, throttle body injection, and/or a carburetor. Motionless one-way valve operation may be optimized by controlling the internal surface temperatures within the motionless one-way valve to prevent pre-ignition reactions and/or unintended combustion within the valve. Optimized operation may be achieved by preventing localized high-pressure areas within the valve.

Figure 8:
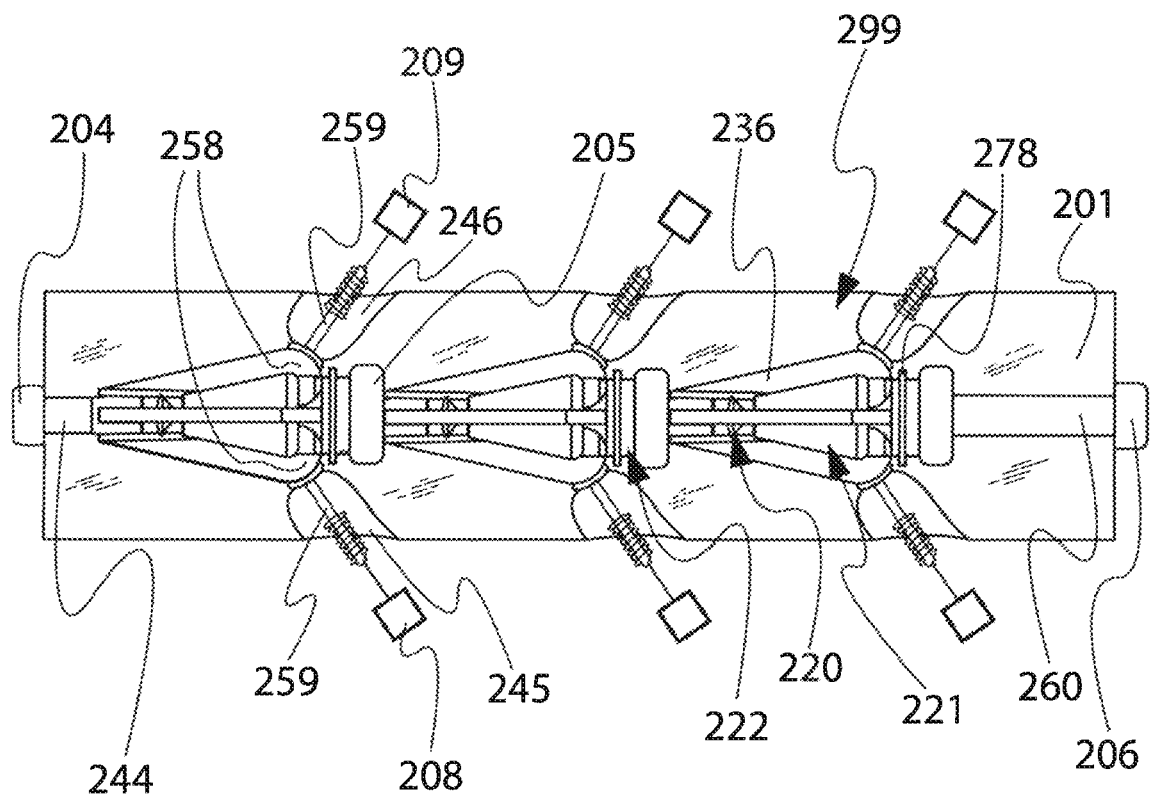
FIG. 8 is a partial cross-sectional view of a particle separator and sorter embodiment of the invention.

FIG. 8 illustrates an example particle sorter/separator embodiment which utilizes the principles of the previously described motionless one-way valve. A particle sorter/separator assembly 299 may include a first shell 201 and a second shell (not shown) which are identical. The first and second shells may define a series of cavities that are disposed between and communicate with a first port 244 at one end, and a second port 260 at an opposite end. The first port 244 may be connected to a sorting input valve 204 and the second port 260 may be connected to a waste output valve 206.

Each cavity in the assembly 299 may contain in series a transition valve 205 (such as solenoid valve), a transition nozzle 222, a funnel nozzle 221, and a reverse flow blocker 220 arranged in the manner described in connection with FIGS. 1A, 1B and 1C. The locating boss 278 maintains the transition nozzle 222 in position relative to the transition valve 205 and funnel nozzle 221, and the fins 236 maintain the funnel nozzle in position relative to the cavity.

Each cavity may communicate with a sorting output port 245 and a back-flush port 246 formed in the shells 201. A first valve assembly 259 in the sorting output port 245 may be selectively opened and closed (i.e., actuated) by an output solenoid 208; and a second valve assembly 259 in the back-flush port 246 may be selectively actuated by a back-flush solenoid 209. The valve assemblies 259 may be poppet type valves, and preferably open by translating into the sorting output port 245 and the back-flush port 246, respectively. Particle accumulation areas may be formed in the portions of the cavities near the sorting output port 245 and the back-flush port 246 of each cavity. Each of the sorting output ports 245 may be connected to collection vessels (not shown). Each of the back-flush ports 246 may be connected to a source of fluid, including but not limited to the source of fluid that supplies working fluid to the first port 244.

The assembly 299 may be used as follows to sort or separate particles suspended in a working fluid by particular size, mass, charge, etc. The sorting or separation process may begin by supplying a working fluid containing the desired particles to the first port 244 by opening the sorting input valve 204 and opening the waste output valve 206 to the degree required to provide appropriate back pressure between the first port 244 and the second port 260. As pressure differential urges the working fluid to flow from the first port 244 towards the second port 260, relatively larger and/or more massive particles tend to accumulate in the accumulation areas 258 near the first and second valve assemblies 259.

The cavity closest to the first port 244 tends to accumulate the heaviest and/or largest particles. For each cavity farther from the first port 244, the accumulated particle mass and/or size tends to decrease. The particles in each of the accumulation areas are harvested by selectively opening and closing the first and/or second valves 259. For example, the first valve assembly 259 disposed in the sorting output port 245 may be opened first, and subsequently the second valve assembly 259 in the back-flush port 246 may be opened and/or the opening of the waste output valve 206 may be modified to introduce back-flushing working fluid. Particles in the accumulation areas 258 may flow out of the sorting output port 245 during a brief opening period of the first valve assembly 259. The first and second valve assemblies 259, and potentially the sorting input valve 204 and the waste output valve 206, may be closed at the end of a particle accumulation cycle. Accumulation cycles may be repeated as much as needed to harvest the desired amounts of select size and weight particles.

When harvesting different particle masses and/or sizes at successive assembly 299 cavities, it is preferred to back-flush only via a back-flush port 246 (and not using the waste output valve 206), and to configure the assembly with at least one back-flush port 246 and at least one sorting output port 245 per cavity. Optionally, a short duration, high pressure back-flush pulse of working fluid may be used in a timed sequence in each successive cavity. It is also preferred to isolate each cavity using the sorting input valve 204, the transition valves 205, and the waste output valve 206 so that each cavity is isolated and the only flow in each cavity is from back-flush port 246 to sorting output port 245. Using a high-speed controller, the transition valves 205 may selectively isolate each cavity from a neighboring cavity during the harvesting step (i.e., the time during which one or both of the first and second valve assemblies 259 are open). The transition valves 205 may employ guillotine, ball, needle, sleeve, butterfly, or other suitable valve mechanisms to temporarily isolate the working fluid within one or more of the cavities. The foregoing process may be used, among other things, to sort particles or isotopes for example. The separator/sorter also may be used to collect particles of a specified size or molecular weight, for example.

Figure 9:
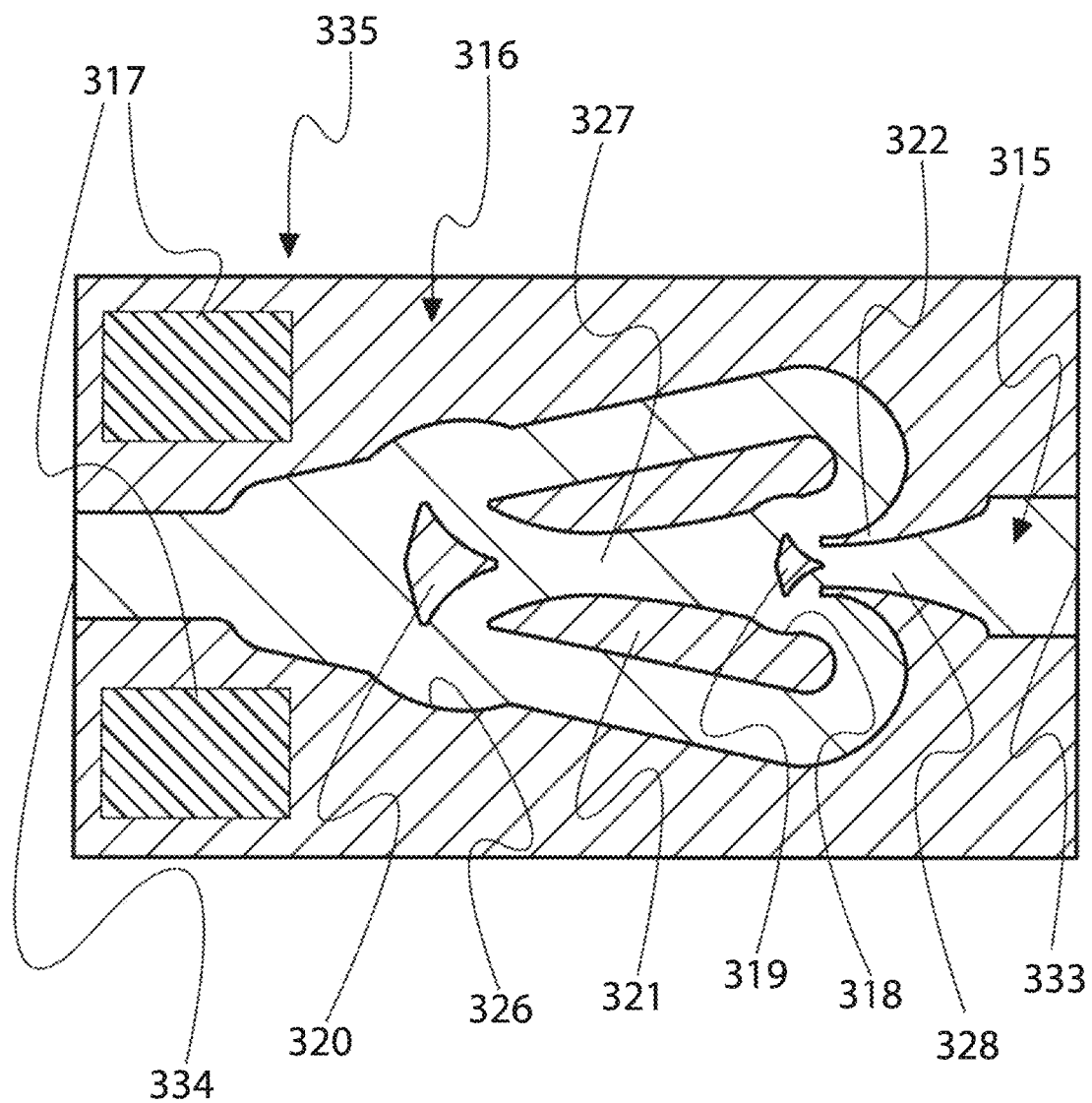
FIG. 9 is a cross-sectional view of an alternative embodiment of the invention used to control the movement of non-fluid substances.

An embodiment of an apparatus for controlling the movement of matter that is not limited to use with fluids is illustrated in the cross-sectional view of FIG. 9. The apparatus 335 is formed out of at least two different materials or at least one material in at least two configurations or states. In FIG. 9, a movement restricting material 316 surrounds a movement supporting material 315. The movement restricting material 316 replaces the structure of the valve body and the internal sub-assemblies in other embodiments and the movement supporting material 315 replaces the open areas in the other embodiments. The shape of the movement restricting material 316 may be similar to or the same as the shapes of the analog elements in FIGS. 1A, 1B and 1C, for example.

In the FIG. 9 embodiment, the moving matter enters the in port 333 and proceeds through a first neck-down area 328 in the transition nozzle 322 and then around an (optional) first reverse flow-blocker 319. Next, the flowing item may flow through a first auxiliary concave flow cavity 318 formed in the wall of the funnel nozzle inner body 321 and into a second neck-down area 327 in the funnel nozzle. The flowing item may flow around a second reverse flow-blocker 320 and through a second auxiliary flow cavity 326 towards an out port 334. Reverse flow is discouraged in a manner similar to that explained in connection with FIG. 2B due to the asymmetry of the flow path.

With reference to FIG. 9, the structures corresponding to those in a motionless one-way valve may be formed out of alternative materials in order for the apparatus 335 to serve as a rectifier to guide (i.e., control the direction of flow of) electrons functioning, in at least one respect, like semiconductor diodes. The apparatus 335 serving as a rectifier may include a first port 333, a second port 334, and a pattern of a first material 315 disposed between the first port and the second port. The pattern of first material 315 may be surrounded by a complimentary pattern of second material 116 so that the shapes of the pattern of first material and the pattern of second material are defined by a boundary between the two materials. The outer portion of the pattern of second material 316 may provide a case for the apparatus 335. The pattern of first material 315 and the pattern of second material 316 may be symmetrically formed about a longitudinal axis extending from the first port 333 to the second port 334.

A portion of the boundary between the pattern of first material 315 and the pattern of second material 316 adjacent to the first port 333 may form a transition nozzle 322. The transition nozzle 322 may define a generally funnel-shaped first passage 328 that is made of first material and centered about the longitudinal axis and extending to the tip portion of the transition nozzle. The outer surface of the transition nozzle 322 at the tip portion may have a smooth curved surface which arcs through 180 degrees or more as it curves away from the longitudinal center axis. In some embodiments, the outer surface of the transition nozzle 322 tip portion may have a substantially inverse half-torus shape accounting for the 180 degrees of curvature.

Another portion of the boundary between the pattern of first material 315 and the pattern of second material 316 may form a first reverse flow blocker 319 adjacent to the transition nozzle 322. The first reverse flow blocker 319 may have a steeply sloped ramped or conical surface proximal to the transition nozzle 322 and a gently sloped ramped or conical surface distal from the transition nozzle. The tip of the steeply sloped ramped surface of the first reverse flow blocker 319 may extend into the tip portion of the transition nozzle 322.

The first reverse flow blocker 319 and the tip portion of the transition nozzle 322 may be surrounded by a funnel nozzle inner body 321 formed by another portion of the boundary between the pattern of first material 315 and the pattern of second material 316. The funnel nozzle inner body 321 may be adjacent to and spaced from the transition nozzle 322. In one embodiment, the funnel nozzle inner body 321 may form a generally frusto-conical ring-shaped wall extending co-axially with the longitudinal axis. The ring-shaped wall may have a rounded or half-torus leading edge at a first end proximal to the transition nozzle 322, and a tapered trailing edge at the second end distal from the first end. The overall shape of the funnel nozzle inner body 321 also may be tapered such that its outer surface decreases in diameter generally evenly between the first end and the second end. The pattern of second material forming the funnel nozzle inner body 321 defines a generally funnel-shaped second passage 327 of first material centered about the longitudinal axis. The tip portion of the transition nozzle 322 may extend into the second passage 327. The portion of the funnel nozzle inner body 321 adjacent to the first reverse flow blocker 319 may be shaped to form a first concave cavity 318 to facilitate flow in one direction around the first reverse flow blocker 319. The diameter of the second passage 327 may vary between the first end and the second end of the funnel nozzle inner body 321. Preferably, the second passage 327 curves gently between the first end and the second end of the funnel nozzle inner body 321. The second passage 327 may have a maximum diameter at the first end and a minimum diameter at a throat portion located closer to the second end of the funnel nozzle inner body 321 than the first end along the longitudinal axis. The second passage 327 may flare progressively between the throat portion and the second end of the funnel nozzle inner body 321 such that the wall surface defining the second passage intersects the outer surface of the inner body at the second end of the inner body to provide a tapered trailing edge.

Another portion of the boundary between the pattern of first material 315 and the pattern of second material 316 may form a counter-flow area surrounding the funnel nozzle inner body 321. The counter-flow area may merge smoothly with the generally half-torus shape of the tip portion of the transition nozzle 322. The outer boundary of the counter-flow area may taper inward evenly along both the outer edge and the inner edge between the first end and the second end of the funnel nozzle inner body 321.

Another portion of the boundary between the pattern of first material 315 and the pattern of second material 316 may form a second reverse flow blocker 320 adjacent to the funnel nozzle inner body 321 and distal from the transition nozzle 322. The second reverse flow blocker 320 may be centered about the longitudinal axis and have a generally steeply ramped or conical portion proximal to the funnel nozzle inner body 321, and a generally mildly ramped or conical portion distal from the funnel nozzle inner body. The portion of the boundary between the pattern of first material 315 and the pattern of second material 316 spaced from and surrounding the second reverse flow blocker 320 may be shaped to form a second concave wall 326 to facilitate flow in one direction around the second reverse flow blocker.

Optional field gates 317 may be embedded in the portion of the pattern of second material 316 surrounding the second port 334. For example, the field gates 317 may generally be comprised of one or more electrically conductive materials such as copper or aluminum or a semi-metal such as graphene.

The first material 315 and the second material 316 may be different materials, or like materials in different states, so long as they provide different flow impediments to a particular type of matter. For example, the second material 316 may be a relatively lower index of refraction glass or plastic selected for its ability to restrict the flow of certain matter, and the first material 315 may be a glass or plastic which permits light of a particular wavelength or range of wavelengths (e.g., optical wavelengths) to travel through it. The optional field gates 317 may not be implemented for optical uses. However, when used, the field gates 317 may induce a Faraday rotation effect on the light passing through the path conducive to flow allowing the apparatus 335 to actively control the emitted light's plane of polarization.

In another example, the first material 315 may generally be comprised of one or more semiconductor materials such as doped silicon, doped diamond, gallium arsenide, or silicon carbide. In this example, the second material 316 may generally be comprised of one or more insulating materials such as glass, silicon, or polyimide. The field gates 317 may not be used in some semiconductor embodiments such as to make a diode, but they could be used in some transistor embodiments, allowing the current flow to be controlled. In yet another example, the apparatus 335 may serve as a photo-detector, an LED, or a solar cell by constructing it from semiconductor materials.

The apparatus 335 in FIG. 9 may handle Terahertz or higher frequencies, currents, and voltages while generating less waste heat, having less radio noise emissions, and having less leakage current than is possible with current semiconductor technology. When employed as a rectifier, the apparatus 335 also may generate less noise in low-level signal applications such as applications for digital signal processing and pre-amplifier stage analog audio signals. A ballistic rectifier, which uses a different structural approach but similar asymmetrical path methodology has been experimentally verified for electron guiding in the laboratory at the University of Rochester in Rochester, N.Y.

It will also be readily apparent that embodiments of the motionless one-way valve may be applied to fluidic computing applications. Motionless one-way valve embodiments also may be constructed on the micrometer or nanometer scale. The valves could be manufactured using methods utilized for semiconductor manufacturing, where structures are built layer by layer by selectively removing and adding material in patterns. This could allow significant miniaturization of fusion reactors, particle accelerators, and/or particle detectors.

As will be understood by those skilled in the art, the invention may be embodied in other specific forms without departing from the spirit or essential characteristics thereof. The elements described above are illustrative examples of one technique for implementing the invention. One skilled in the art will recognize that many other implementations are possible without departing from the intended scope of the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. An engine or pump comprising:
   a chamber having a chamber wall separating a chamber interior from a chamber exterior;
   a chamber port extending through the chamber wall to provide communication between the chamber interior and the chamber exterior; and
   a valve disposed proximal to the chamber port, said valve having one or more components having a stationary position relative to each other and relative to the chamber wall, and said valve being configured to control a flow of fluid,
   wherein the valve permits the flow of fluid from the chamber exterior to the chamber interior,
   wherein the valve restricts the flow of fluid from the chamber interior to the chamber exterior,
   wherein the one or more components of the valve include a funnel nozzle inner body separating an inner passage extending through the funnel nozzle inner body from a counter-flow area disposed about the funnel nozzle inner body, and
   wherein the one or more components of the valve remain in the stationary position relative to each other and relative to the chamber wall to permit the flow of fluid from the chamber exterior to the chamber interior and to restrict the flow of fluid from the chamber interior to the chamber exterior.

2. The engine or pump of claim 1, further comprising:
first and second opposing pistons disposed in the chamber,
wherein the chamber port is disposed between, and approximately equidistant from the first and second opposing pistons.

3. The engine or pump of claim 1, further comprising:
a piston disposed in the chamber; and
an exhaust port extending through the chamber wall to provide communication between the chamber interior and the chamber exterior,
wherein the piston is configured to reciprocate in the chamber toward and away from the chamber port without blocking the chamber port; and
wherein the piston is configured to reciprocate in the chamber so that the exhaust port is cyclically blocked from and revealed to the chamber interior.

4. The engine or pump of claim 1, further comprising:
a piston disposed in the chamber, said piston having a piston passage extending therethrough; and
an exhaust port extending through the chamber wall to provide communication between the chamber interior and the chamber exterior,
wherein the piston is configured to reciprocate in the chamber toward and away from the chamber port without blocking the chamber port; and
wherein the piston is configured to reciprocate in the chamber so that the exhaust port is cyclically aligned with the piston passage.

5. The engine or pump of claim 4, further comprising swirl ribs formed in a wall portion of the piston passage.

6. The engine or pump of claim 1, further comprising:
an intake port extending through the chamber wall to provide communication between the chamber interior and the chamber exterior; and
a first poppet valve disposed in the intake port.

7. The engine or pump of claim 6, further comprising:
a second poppet valve disposed in the chamber port between the valve and the chamber interior.

8. The engine or pump of claim 1, wherein the valve further comprises:
a transition nozzle having a generally funnel-shaped first passage extending from a first end of the transition nozzle to a second end of the transition nozzle, said transition nozzle having a curved outer surface proximal to the transition nozzle second end; and
a reverse flow blocker disposed adjacent to the funnel nozzle inner body and distal from the transition nozzle, said reverse flow blocker having a generally ramped upper portion proximal to the funnel nozzle inner body and a generally ramped lower portion distal from the funnel nozzle inner body,
wherein said funnel nozzle inner body is disposed adjacent to the transition nozzle, the inner passage of the funnel nozzle inner body is generally funnel-shaped and extends from a first end of the funnel nozzle inner body to a second end of the funnel nozzle inner body, and wherein a portion of the second end of the transition nozzle extends into the inner passage of the funnel nozzle inner body.

9. The engine or pump of claim 8, wherein the curved outer surface of the transition nozzle has an inverse partial torus shape.

10. The engine or pump of claim 8, wherein the upper portion of the reverse flow blocker is generally cone shaped with a gently concave curved surface, and
wherein the lower portion of the reverse flow blocker is generally cone shaped.

11. The engine or pump of claim 8, wherein the valve further comprises:
a cavity surrounding the transition nozzle, the funnel nozzle inner body, and the reverse flow blocker;
one or more additional cavities provided in series with said cavity; and
another transition nozzle, another funnel nozzle inner body, and another reverse flow blocker disposed in each of said one or more additional cavities.

12. The engine or pump of claim 8, wherein a width of the reverse flow blocker at a widest point is as great as, or greater than, a width of the generally funnel-shaped inner passage at the second end of the funnel nozzle inner body.

13. The engine or pump of claim 8, wherein the generally funnel-shaped inner passage has a minimum width at a point along a longitudinal axis that is spaced from the first end and the second end of the funnel nozzle inner body.

14. The engine or pump of claim 8, wherein the transition nozzle, the funnel nozzle inner body, and the reverse flow blocker each have a circular cross-section taken perpendicular to a longitudinal axis.

15. The engine or pump of claim 8, further comprising:
a cavity wall surrounding and spaced from the funnel nozzle inner body; and
one or more supports extending between the funnel nozzle inner body and the cavity wall.

16. The engine or pump of claim 15, wherein each of the one or more supports is a fin.

17. The engine or pump of claim 1, wherein the valve comprises:
a fluid-tight case having a first fluid port, a second fluid port, and a cavity disposed between and in fluid communication with the first fluid port and the second fluid port, said cavity having a longitudinal axis extending from a first end of the cavity to a second end of the cavity, said cavity having a curved wall section;
a transition nozzle disposed in the cavity, said transition nozzle having a generally funnel-shaped first passage centered about the longitudinal axis and extending from a first end of the transition nozzle to a second end of the transition nozzle, said transition nozzle having a curved outer surface, wherein the transition nozzle curved outer surface is aligned cooperatively with the cavity curved wall section to form a generally smooth curved continuous wall; and
a reverse flow blocker disposed in the cavity adjacent to the funnel nozzle inner body, distal from the transition nozzle, and centered about the longitudinal axis, said reverse flow blocker having a generally ramped upper portion relative to the longitudinal axis, and a generally ramped lower portion relative to the longitudinal axis
wherein said funnel nozzle inner body is disposed adjacent to the transition nozzle, the inner passage of the funnel nozzle inner body is generally funnel-shaped and extends from a first end of the funnel nozzle inner body to a second end of the funnel nozzle inner body, and wherein a portion of the second end of the transition nozzle extends into the inner passage of the funnel nozzle inner body.

18. The engine or pump of claim 17, further comprising:
a secondary reverse flow blocker disposed proximal to the first end of the funnel nozzle inner body.

* * * * *